(12) United States Patent
Ishihara et al.

(10) Patent No.: US 7,365,775 B2
(45) Date of Patent: Apr. 29, 2008

(54) IMAGE COMPRESSION APPARATUS AND METHOD, IMAGE REGENERATION APPARATUS, CAMERA AND CAMERA SYSTEM

(75) Inventors: Haruyuki Ishihara, Tokyo (JP); Tsugumoto Kosugiyama, Tokyo (JP); Yoji Watanabe, Tokyo (JP); Mitsuo Goto, Beijing (CN)

(73) Assignee: Olympus Corporation, Tokyo (JP)

( * ) Notice: Subject to any disclaimer, the term of this patent is extended or adjusted under 35 U.S.C. 154(b) by 948 days.

(21) Appl. No.: 10/437,475

(22) Filed: May 14, 2003

(65) Prior Publication Data

US 2004/0119840 A1  Jun. 24, 2004

(30) Foreign Application Priority Data

May 20, 2002 (JP) ............................. 2002-144473
May 24, 2002 (JP) ............................. 2002-150369
May 31, 2002 (JP) ............................. 2002-160554

(51) Int. Cl.
*H04N 5/228* (2006.01)
*H04N 7/12* (2006.01)
*H04N 11/02* (2006.01)
*H04N 11/04* (2006.01)
*H04B 1/66* (2006.01)
*G06K 9/36* (2006.01)
*G06K 9/46* (2006.01)

(52) U.S. Cl. ............................. 348/222.1; 348/404.1; 375/240.04; 382/239

(58) Field of Classification Search ........... 375/240.03; 348/240.04, 390.1, 404.1, 405.1, 222.1; 382/239
See application file for complete search history.

(56) References Cited

U.S. PATENT DOCUMENTS

| 5,517,583 | A | * | 5/1996 | Horiuchi et al. ............ 382/239 |
| 5,594,554 | A |   | 1/1997 | Farkash et al. |
| 6,553,068 | B1 | * | 4/2003 | Wake et al. ............ 375/240.14 |
| 6,614,942 | B1 | * | 9/2003 | Meier ........................ 382/233 |

FOREIGN PATENT DOCUMENTS

| EP | 0447247 | 9/1991 |
| JP | 03-267877 | 11/1991 |
| JP | 05072608 | 3/1993 |
| JP | 07030838 | 1/1995 |
| JP | 09-018867 | 1/1997 |
| JP | 10-117352 | 5/1998 |
| JP | 11174576 | 7/1999 |
| JP | 11-261952 | 9/1999 |
| JP | 11284894 | 10/1999 |
| JP | 2000-125239 | 4/2000 |
| JP | 2000-184367 | 6/2000 |
| JP | 2002-101329 | 4/2002 |

* cited by examiner

*Primary Examiner*—Lin Ye
*Assistant Examiner*—Jason Whipkey
(74) *Attorney, Agent, or Firm*—Volpe & Koenig

(57) ABSTRACT

A process and apparatus for displaying and recording image data can be smoothly performed in characteristic methods by computing a quantization parameter for use in compression of image data, obtaining a difference in the amount of processes between the display of image data and the recording of image data, and managing memory of temporarily stored image data for regeneration of recorded image data.

8 Claims, 21 Drawing Sheets

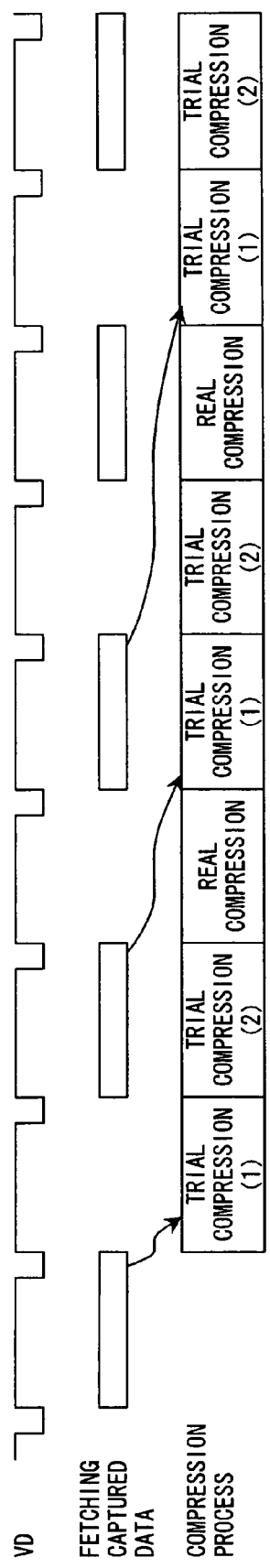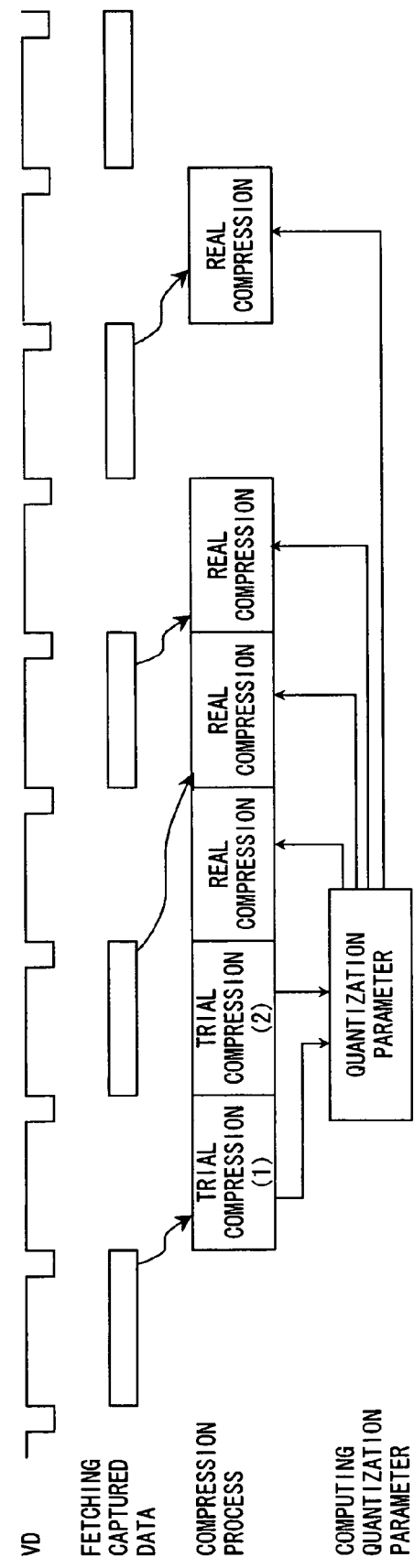

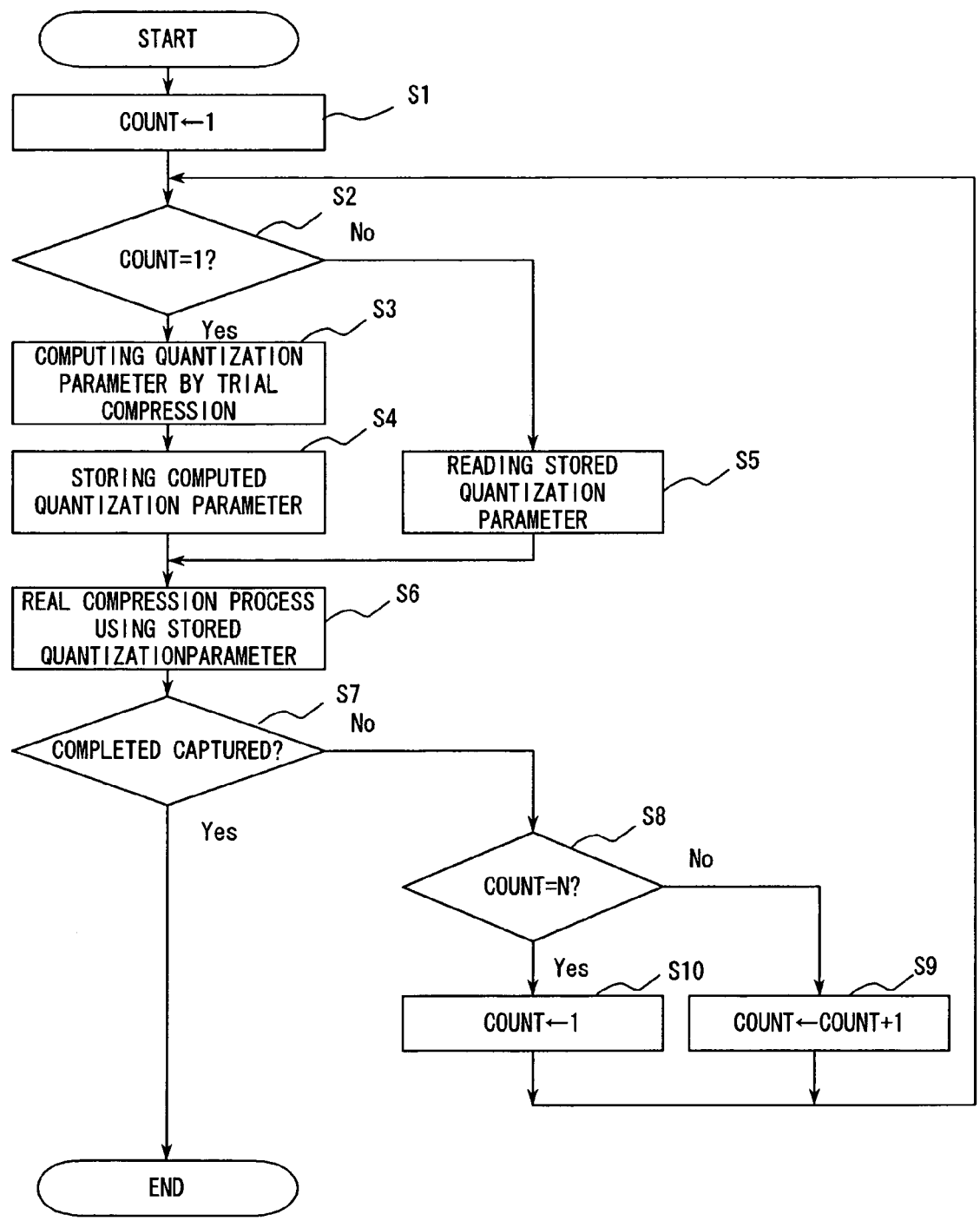
F I G. 4

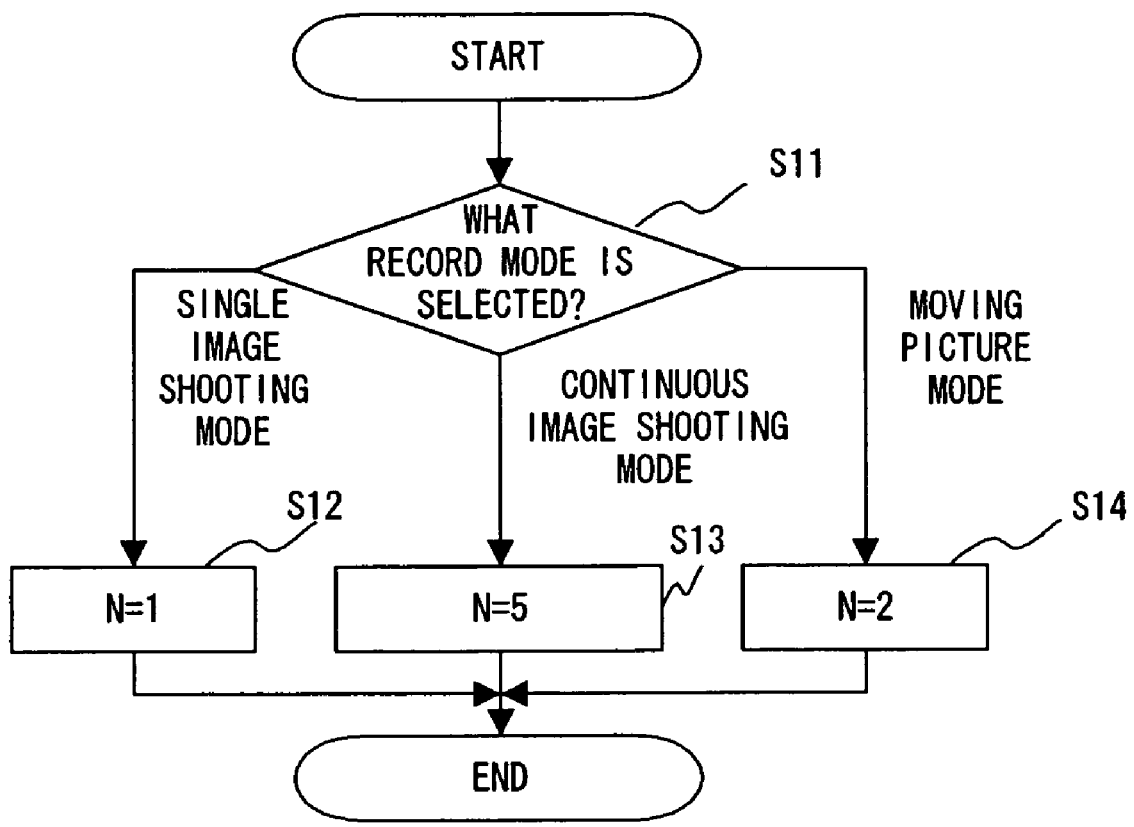
F I G. 5

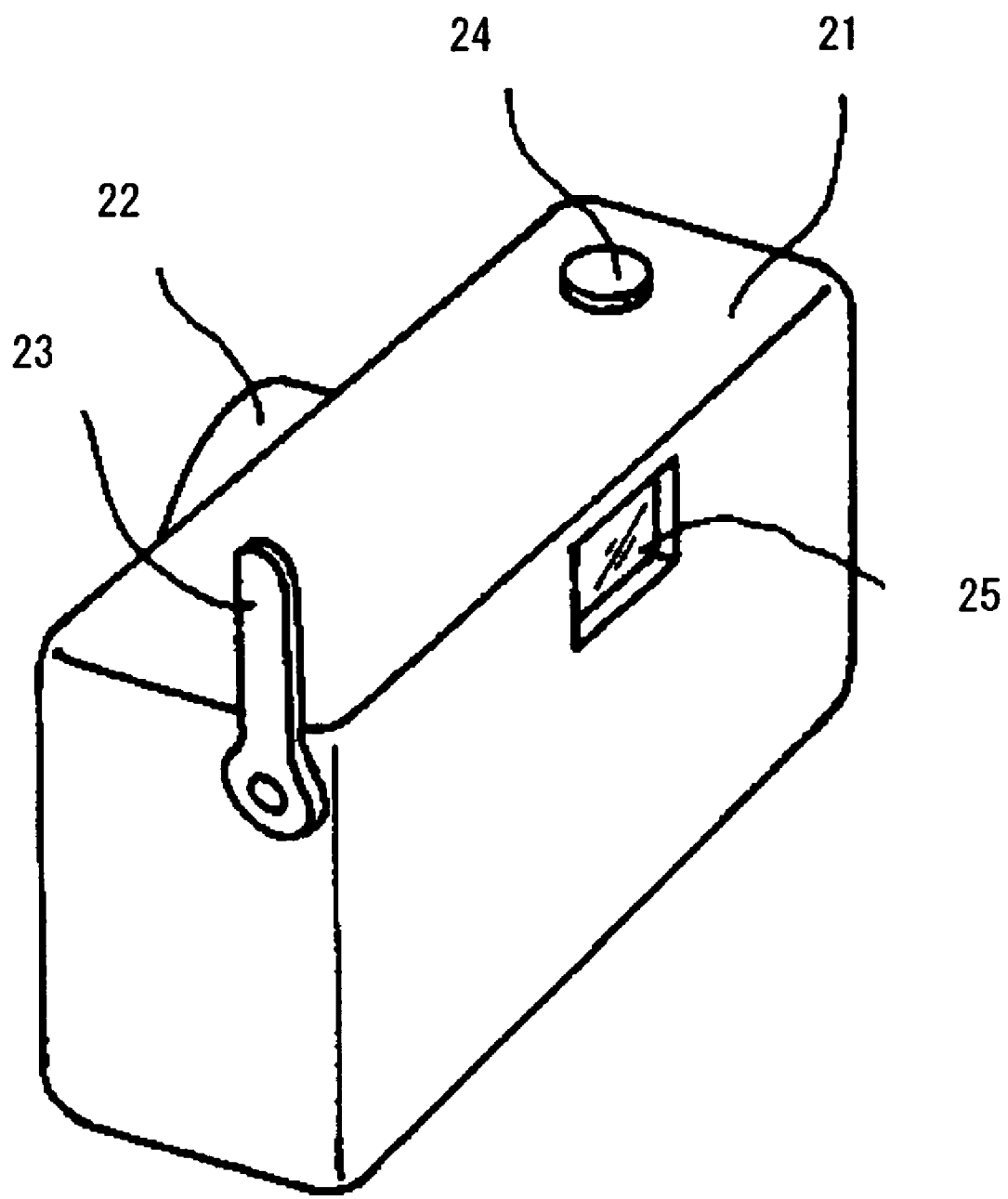
F I G. 6

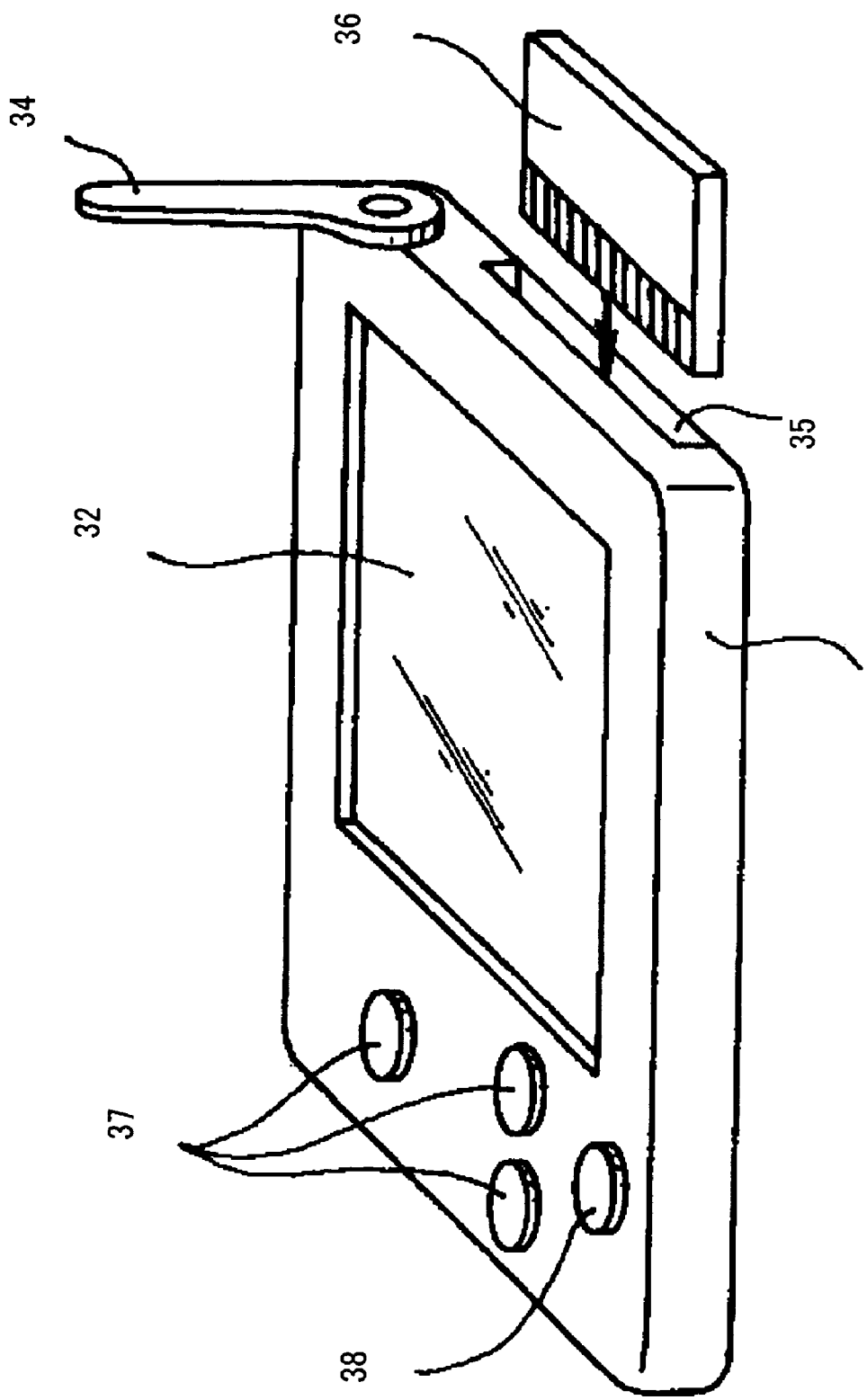
F I G. 7

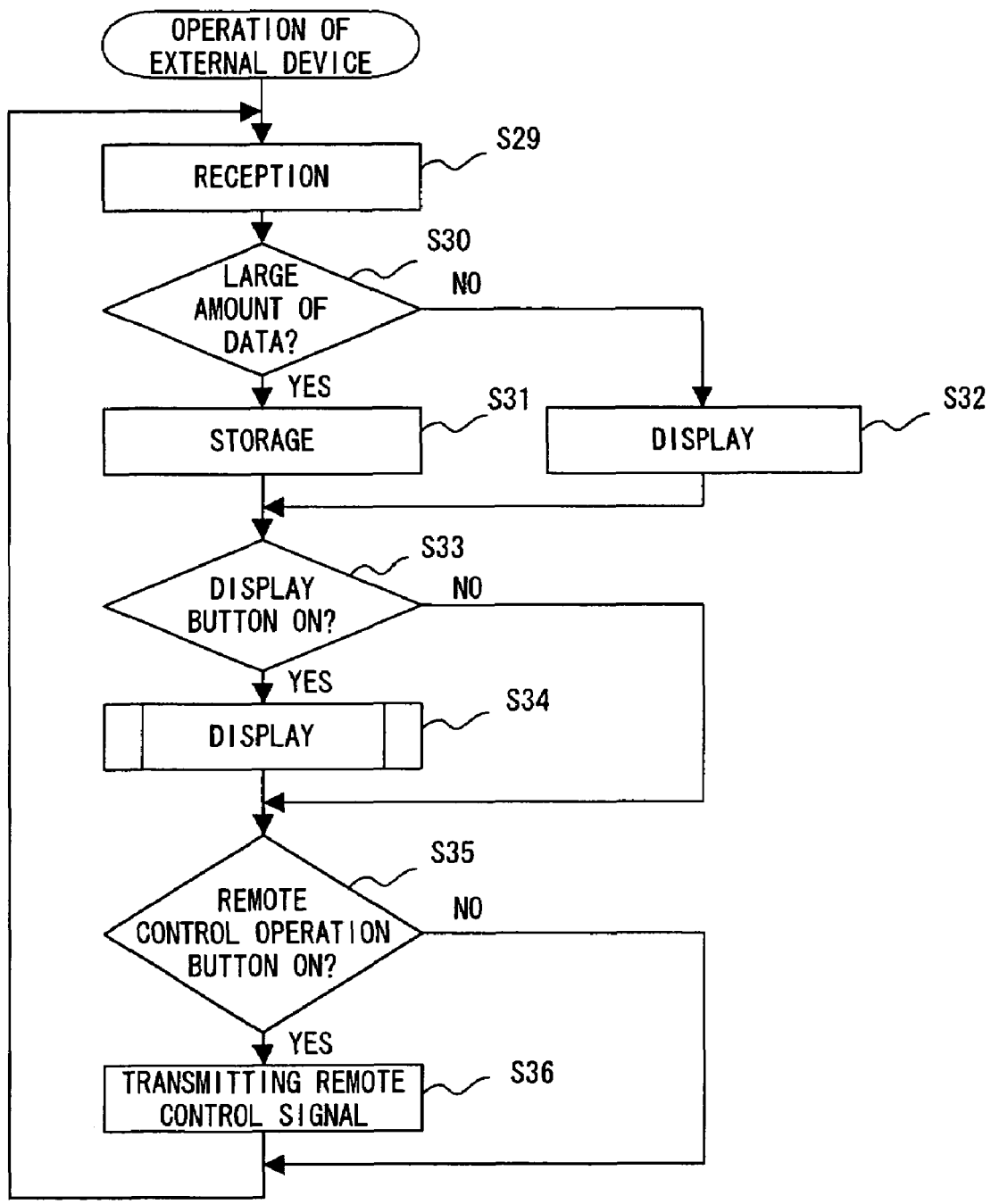
F I G. 1 1

STILL IMAGE DATA

MOVING PICTURE DATA

| IMAGE DATA FOR DISPLAY n-m |
|---|
| IMAGE DATA FOR DISPLAY n-m+1 |
| ⋮ |
| IMAGE DATA FOR DISPLAY n-3 |
| IMAGE DATA FOR DISPLAY n-2 |
| IMAGE DATA FOR DISPLAY n-1 |
| STILL IMAGE DATA n |
| IMAGE DATA FOR DISPLAY n+1 |
| IMAGE DATA FOR DISPLAY n+2 |
| IMAGE DATA FOR DISPLAY n+3 |
| ⋮ |
| IMAGE DATA FOR DISPLAY n+m-1 |
| IMAGE DATA FOR DISPLAY n+m |

F I G. 1 4 A

| IMAGE DATA FOR DISPLAY n-m+1 |
|---|
| IMAGE DATA FOR DISPLAY n-m+2 |
| ⋮ |
| IMAGE DATA FOR DISPLAY n-2 |
| IMAGE DATA FOR DISPLAY n-1 |
| STILL IMAGE DATA n |
| STILL IMAGE DATA n+1 |
| IMAGE DATA FOR DISPLAY n+2 |
| IMAGE DATA FOR DISPLAY n+3 |
| IMAGE DATA FOR DISPLAY n+4 |
| ⋮ |
| IMAGE DATA FOR DISPLAY n+m |
| IMAGE DATA FOR DISPLAY n+m+1 | Y1

F I G. 1 4 B

| | |
|---|---|
| Y2 | C(n+1)2 |
| Y4 | C(n+1)4 |
| ↓ | ⋮ |
| | C(n+1)2k |
| | C(n+1)2k+2 |
| | STILL IMAGE DATA n |
| | REPRESENTATIVE IMAGE DATA n+1 |
| | IMAGE DATA FOR DISPLAY n+2 |
| | C(n+1)2k+1 |
| | C(n+1)2k-1 |
| ↑ | ⋮ |
| Y3 | C(n+1)3 |
| Y1 | C(n+1)1 |

| |
|---|
| C(n)2 |
| C(n)4 |
| ⋮ |
| C(n)2k |
| C(n)2k+2 |
| IMAGE DATA FOR DISPLAY  n−1 |
| REPRESENTATIVE IMAGE DATA  n |
| IMAGE DATA FOR DISPLAY  n+1 |
| C(n)2k+1 |
| C(n)2k−1 |
| ⋮ |
| C(n)3 |
| C(n)1 |

↓ (left side, top)
↑ (left side, bottom)

FIG. 15B

| | |
|---|---|
| | IMAGE DATA FOR DISPLAY  n−m+1 |
| | IMAGE DATA FOR DISPLAY  n−m+2 |
| | ⋮ |
| Y4 | IMAGE DATA FOR DISPLAY  n−2 |
| | IMAGE DATA FOR DISPLAY  n−1 |
| | REPRESENTATIVE IMAGE DATA  n |
| | STILL IMAGE DATA  n+1 |
| Y1 | IMAGE DATA FOR DISPLAY  n+2 |
| Y2 | IMAGE DATA FOR DISPLAY  n+3 |
| Y3 | IMAGE DATA FOR DISPLAY  n+4 |
| | ⋮ |
| | IMAGE DATA FOR DISPLAY  n+m |
| | IMAGE DATA FOR DISPLAY  n+m+1 |

↑ (top), ↓ (bottom)

FIG. 15C

| | |
|---|---|
| Y3 | C(n+1)2 |
| Y5 | C(n+1)4 |
| ↓ | ⋮ |
| | C(n+1)2k |
| | C(n+1)2k+2 |
| | REPRESENTATIVE IMAGE DATA  n |
| | REPRESENTATIVE IMAGE DATA  n+1 |
| Y1 | IMAGE DATA FOR DISPLAY  n+2 |
| | C(n+1)2k+1 |
| | C(n+1)2k−1 |
| ↑ | ⋮ |
| Y4 | C(n+1)3 |
| Y2 | C(n+1)1 |

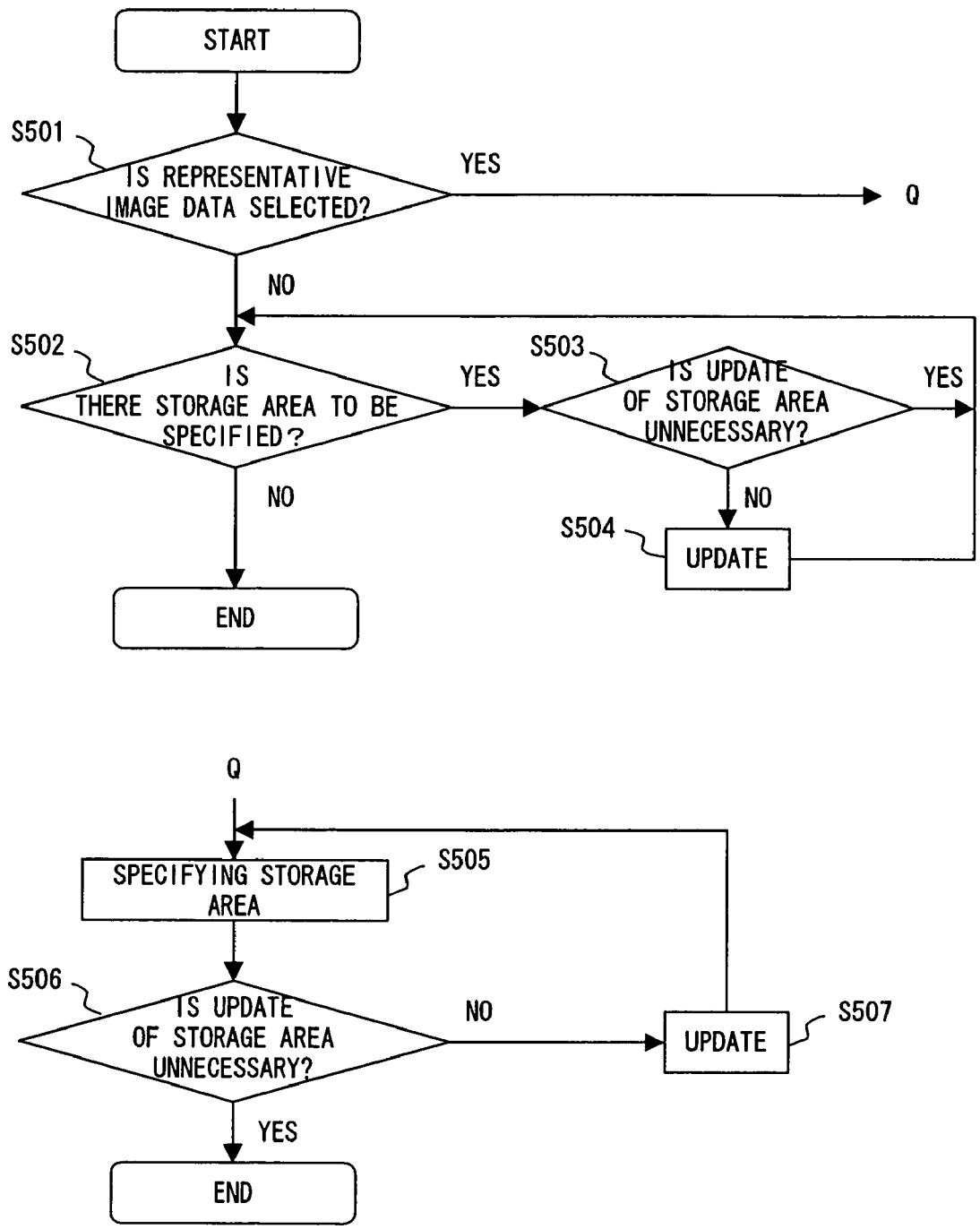
F I G. 1 7

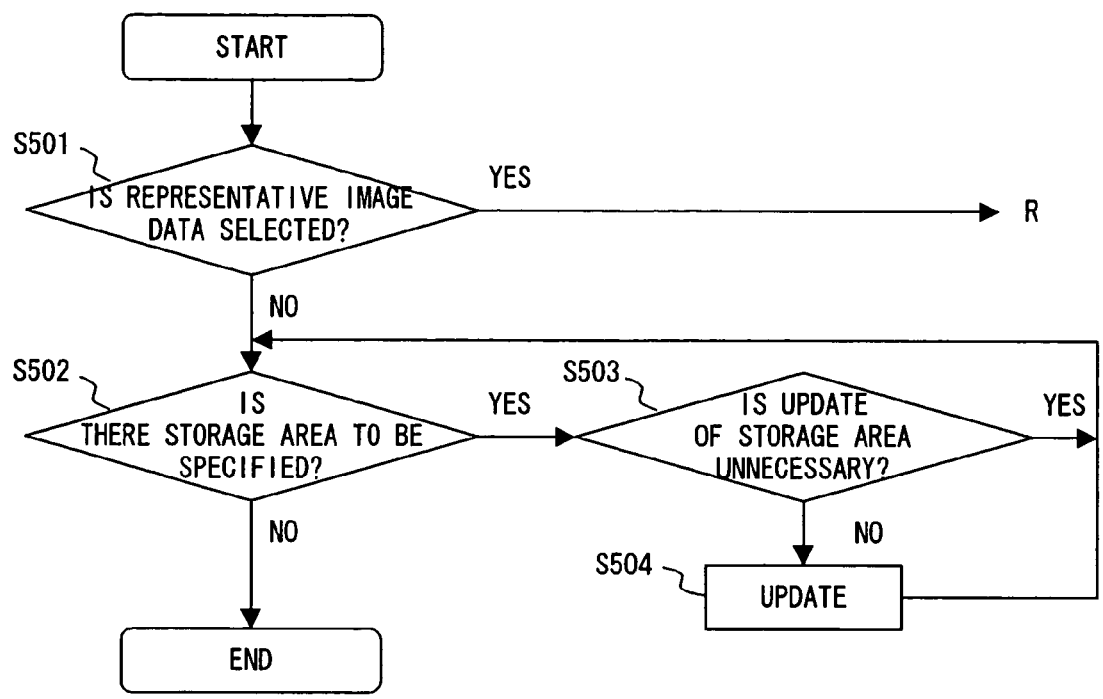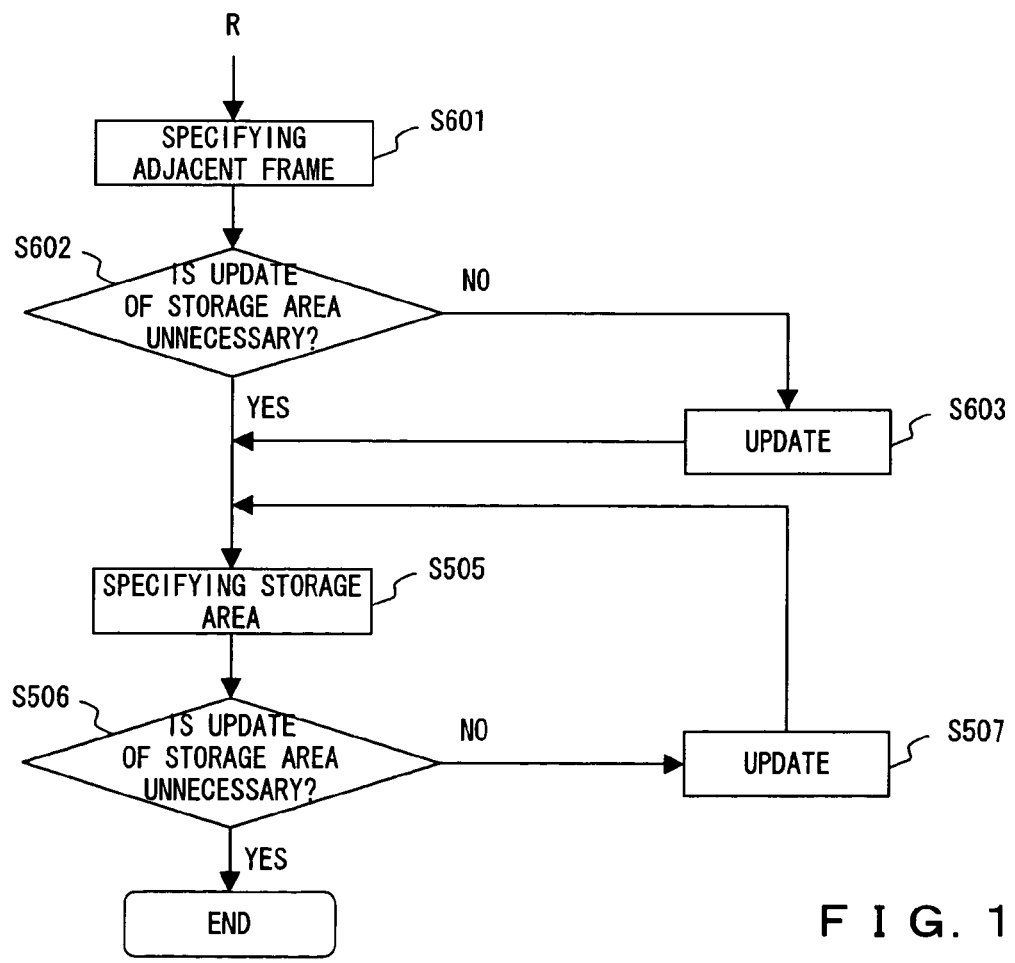
FIG. 18

IMAGE COMPRESSION APPARATUS AND METHOD, IMAGE REGENERATION APPARATUS, CAMERA AND CAMERA SYSTEM

BACKGROUND OF THE INVENTION

1. Field of the Invention

The present invention relates to a technology of operating on image data in an image compression process, an image regeneration process, and an image quality switching process.

2. Description of the Related Art

A digital camera is generally known as a device capable of shooting a subject, displaying a shot image, and recording the shot image.

With the digital camera, a subject image is input as an electric signal by an optoelectronic conversion by an image pickup device such as a CCD (charge coupled device), and various processes such as color signal processing, etc. and an analog-to-digital conversion are performed on the input subject image. Thus, the generated subject image can be processed as digital data, and digital processing such as image compression and decompression is performed. When the subject image is recorded, it can be recorded to a built-in memory of a digital camera or a recording medium (for example, CompactFlash®, SmartMedia®, etc.) removable from a digital camera. When the subject image is displayed, it can be displayed on a display unit (for example, an LCD, etc.) configured in a digital camera.

Furthermore, in the above-mentioned digital camera, the subject image can be recorded in the recording unit of an external communications device, or displayed on the display unit of an external communications device by combining and using external communications devices having large-capacity recording units and display units.

The technology of recording the subject image in the recording unit of the external communications device has been disclosed as transferring captured image data to an external device having a large-capacity recording medium by a wireless communications unit, and clearing the transferred image data from the built-in memory of a camera in the Japanese Patent Application Laid-open No. 11-284894.

Furthermore, the technology of displaying a subject image on the external communications device has been disclosed as capable of transmitting, to a remote control device, a subject image captured by a digital camera before a shutter operation (transmitting the above-mentioned release signal) from a remote control device by using the well-known technology according to the release signal from the remote control device, and checking the subject image in advance on the display unit of the remote control device in the Japanese Patent Application Laid-open No. 5-72608.

Furthermore, the technology of displaying a subject image on the external communications device has been disclosed as improving the communications speed of the subject image by performing a binarization process on the subject image when a captured subject image is transmitted to the external communications device in the Japanese Patent Application Laid-open No. 11-174576.

In the above-mentioned digital camera, the above-mentioned compression process is performed on a digitized subject image.

The technology of obtaining the optimum compression rate for each subject image in the compression process has been disclosed as determining a quantization parameter based on two trial compression processes on the subject image, and performing a real compression process on the subject image according to the determined quantization parameter in the U.S. Pat. No. 5,594,554.

FIG. 1A is a timing chart for explanation of the technology.

FIG. 1A shows the timing chart of the trial compression and the real compression performed on the fetched input image (subject image) based on the vertical synchronizing signal VD.

That is, as shown in the timing chart in FIG. 1A, the technology performs two trial compression processes on the input image fetched as image data, obtains a quantization parameter and the amount of coded data for each of the trial compression processes, computes a target quantization parameter based on the obtained quantization parameter and the amount of coded data, performs a real compression process on each input image based on the computed target quantization parameter.

As another technology of optimizing the compression rate for each subject image when the above-mentioned compression process is performed, a method of obtaining a quantization parameter by performing a trial compression process only on the leading frame of an input image, and performing the compression process on the subsequent frames using the quantization parameter used in the compression process on the leading frame is suggested.

FIG. 1B is a timing chart for explanation of the method.

As shown in FIG. 1B, two trial compression processes are performed on the leading frame of an input image, a real compression process is performed on the leading frame according to the target quantization parameter similarly obtained as in the trial compression process, and a real compression process is performed on each image input subsequently using the same quantization parameter.

Thus, the compressed subject image is displayed on the display unit of a digital camera or the display unit of an external communications device, or recorded in the recording memory built in a digital camera, a removable recording medium, or a recording unit of an external communications device.

Additionally, at a regeneration designation, a digital camera reads a subject image recorded to the recording medium or the recording unit of an external communications device, and performs a compression/decompression process, etc. on the read subject image, thereby regenerating an image on the display unit of the digital camera.

The larger the amount of the data of a subject image, the longer the time required from the regeneration designation on the subject image to the display of the subject image on the display unit (hereinafter referred to as a "regeneration start waiting time" in the present specifications).

The moving picture data which has recently been widely used with the remarkable progress of hardware specifically requires a longer regeneration start waiting time.

The technology of shortening the regeneration start waiting time for moving picture data has been disclosed as recording in advance a scene or a cut of moving picture data as a segmentation unit, and the regeneration starting position of each unit as an index, and reading the address information about a part of data of the moving picture data and the subsequent moving picture data recorded in the recording unit in the buffer memory, thereby immediately regenerating a desired scene by specifying the starting address from the above-mentioned index recorded in advance.

Thus, the processes have been performed corresponding to the image data in the image compression process, the image regeneration process, the image quality switching process, etc.

SUMMARY OF THE INVENTION

The first object of the present invention is to provide a technology of shortening an image compression processing time without image degradation on a compressed image, and the image compression apparatus for sequentially compressing each of the continuously input images according to a quantization parameter includes: a processing unit for compressing an input image according to a quantization parameter; a computation unit for computing the quantization parameter by performing trial compression on an input image; and a control unit for allowing the computation unit to compute a new quantization parameter on each image input at an interval of a predetermined number of images and allowing the processing unit to compress each input image according to the new quantization parameter, and allowing the processing unit to compress the other input images according to a latest quantization parameter used immediately before the computation of the new quantization parameter.

A second object of the present invention is to provide a technology of checking a subject image by displaying smoothly the subject image on the display unit of an external communications device before shooting, and includes: a capture unit for obtaining an electronic image of a subject by capturing the subject through a shooting optic system; an image processing unit for generating digital image data by processing a signal output from the capture unit; a reduction unit for performing a compression process or a thinning process on the image data output from the image processing unit; and a communications unit for transmitting the image data to an external device. With the above-mentioned configuration, the reduction unit determines a compression rate of the image data before inputting a capture designation signal higher than that after the input of the capture designation signal, or determines an amount of thinning of the image data before the input of the capture designation signal larger than that after the input of the capture designation signal.

A third object of the present invention is to provide a technology appropriate for downsizing by shortening the regeneration start waiting time of moving picture data and still image data, and the image regeneration apparatus, which regenerates image data of at least the image data group in the image data group including representative image data and plural pieces of image data associated with the representative image data or a single piece of image data, provided by a built-in recording medium of the apparatus, or a recording medium mounted on the apparatus, includes: a temporary storage unit for temporarily storing at least one piece of representative image data in the representative image data and the image data group, or the single piece of image data; an image selection unit for selecting a piece of image data as an image to be displayed from the temporarily stored representative image data or a single piece of image data; a reproduction designation unit for designating for regeneration of an image data group associated with selected representative image data when the representative image data is selected by the image selection unit; and a storage control unit for controlling the image data of the image data group to be temporarily stored in the temporary storage unit before the regeneration of the image data group by the designation for regeneration.

BRIEF DESCRIPTION OF THE DRAWINGS

FIG. 1A is a first timing chart of the conventional image compression process;

FIG. 1B is a second timing chart of the conventional image compression process;

FIG. 4 shows the flow of the operations in the image compression process of the digital camera to which the image compression apparatus according to the present invention is applied;

FIG. 5 shows the flow of the operations in each record mode in the image compression process of the digital camera to which the image compression apparatus according to the present invention is applied;

FIG. 6 is a back view from obliquely left and above a camera according to the present invention;

FIG. 7 is an oblique view of the external device according to an embodiment of the camera system of the present invention;

FIG. 11 shows the flow of the operations of the external device shown in FIG. 7;

FIG. 14A shows an example of the concept of managing buffer memory in the image regeneration apparatus of the present invention;

FIG. 14B is an explanatory view showing the first storage control method of the buffer memory based on FIG. 14A;

FIG. 14C is an explanatory view showing the second storage control method of the buffer memory based on FIG. 14A;

FIG. 15A shows an example of the concept of managing buffer memory in the image regeneration apparatus of the present invention;

FIG. 15B is an explanatory view showing the first storage control method of the buffer memory based on FIG. 15A;

FIG. 15C is an explanatory view showing the second storage control method of the buffer memory based on FIG. 15A;

FIG. 17 shows the flow of the operations of the first storage control method of the buffer memory in the digital camera shown in FIG. 16;

FIG. 18 shows the flow of the operations of the second storage control method of the buffer memory in the digital camera shown in FIG. 16;

DESCRIPTION OF THE PREFERRED EMBODIMENT

Figure 2:
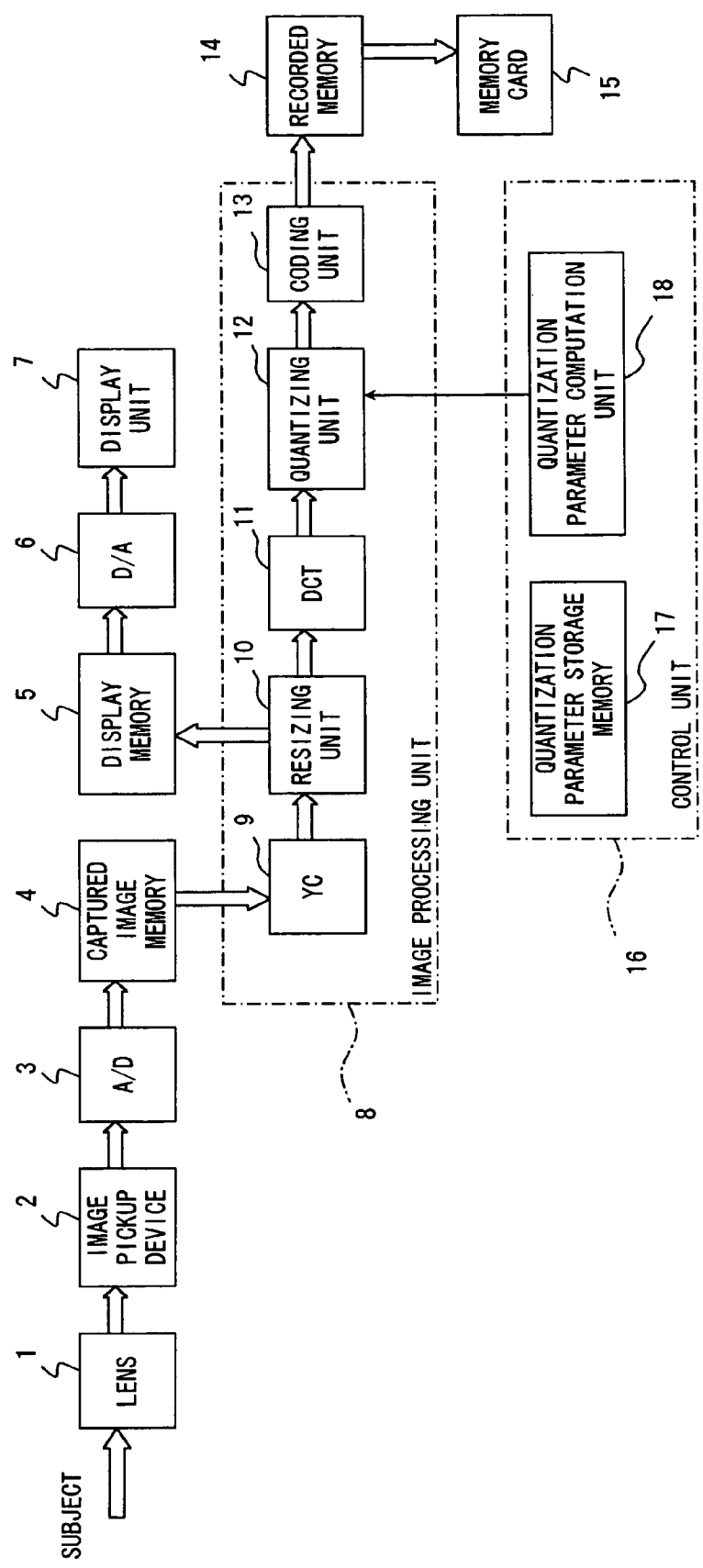
FIG. 2 shows the configuration of a block diagram of the digital camera to which the image compression process according to the present invention is applied.

One of the first aspects of the present invention is the image compression apparatus which sequentially compresses continuously input images according to a quantization parameter, including: a processing unit for compressing an input image according to a quantization parameter; a computation unit for computing the quantization parameter by performing trial compression on an input image; and a control unit for allowing the computation unit to compute a new quantization parameter on each image input at an interval of a predetermined number of images and allowing the processing unit to compress each input image according to the new quantization parameter, and allowing the processing unit to compress the other input images according to a latest quantization parameter used immediately before the computation of the new quantization parameter.

With the above-mentioned configuration of the image compression apparatus, trial compression is performed on images input at an interval of a predetermined number of images to compute a new quantization parameter, thereby performing a compression process. On the other images a compression process is performed using the latest stored quantization parameter. Therefore, the quantization parameter is updated for each interval of a predetermined number of images so that image degradation can be reduced and an image compression apparatus capable of quickly performing an efficient compression process can be realized.

Furthermore, continuous input images can be obtained by shooting moving pictures.

With the above-mentioned configuration, an efficient compression process can be quickly performed on moving pictures with the image degradation reduced.

The above-mentioned continuous input images can be continuously shot images.

With the above-mentioned configuration, an efficient compression process can be quickly performed on continuously shot images with the image degradation reduced.

In the image compressing method of sequentially compressing continuously input images according to a quantization parameter, a new quantization parameter is computed by performing trial compression on each image input at an interval of a predetermined number of images, whenever the image is input, thereby performing a compression process for each input image according to the computed quantization parameter. The other input images are compressed according to the latest quantization parameter used immediately before the computation of the new quantization parameter.

With the above-mentioned configuration of the image compressing method, trial compression is performed on each image input at an interval of a predetermined number of images to compute a new quantization parameter whenever the image is input, thereby performing a compression process for each input image. On the other images a compression process is performed using the latest stored quantization parameter. Therefore, the quantization parameter is updated for each interval of a predetermined number of images so that image degradation can be reduced and an image compressing method capable of quickly performing an efficient compression process can be realized.

According to another aspect of the first aspects of the present invention, an image compressing program is executed by a computer and configured by the procedures of: computing a quantization parameter by performing trial compression on each image input at an interval of a predetermined number of images whenever the image is input, and performing a compression process for the input image according to the computed quantization parameter; and performing a compression process for the other input images according to the latest quantization parameter used immediately before the computation of the new quantization parameter.

With the above-mentioned configuration, a quantization parameter is updated for each interval of a predetermined number of images, thereby reducing the generation of image degradation, and realizing an image compressing program for quickly performing an efficient compression process.

According to a further aspect of the first aspects of the present invention, an image compression apparatus, which compresses input images according to a quantization parameter, includes a computation unit for computing the quantization parameter by performing trial compression on an input image; a control unit for operating the computation unit for images input at a time interval longer than a predetermined time corresponding to each input image, and operating the computation unit for images input at a time interval shorter than a predetermined time corresponding to each image input at an interval of a predetermined number of images; and a processing unit for compressing input images according to the computed quantization parameter. A predetermined time is appropriately set and refers to a time in which there is a large difference among input images in scenes if the time exceeds an input time interval.

In the image compression apparatus with the above-mentioned configuration, a new quantization parameter is computed for each input image by assuming that scenes are quite different among input images when the input images are input at time intervals longer than a predetermined time. Therefore, the quantization parameters are similar in compression processing. On the other hand, a new quantization parameter is computed for each input image on the images input at an interval of a predetermined number of images by assuming that scenes are not quite different among input images when the input images are input at time intervals shorter than a predetermined time. Therefore, quantization parameters are not so different, the compression processing time is not extended, or the input speeds of the input images are not limited. As a result, the style of updating a quantization parameter can depend on the input time interval of an input image, thereby appropriately performing a compression process corresponding to the input style of an input image.

The processing unit can perform a compression process according to the latest computed quantization parameter on an input image input at a short time interval for which no quantization parameter has been computed.

In the image compression apparatus with the above-mentioned configuration, the latest quantization parameter is used on an input image for which a quantization parameter is not computed. Therefore, the available quantization parameter is not so different from the preceding quantization parameters, and the image degradation can be reduced.

Furthermore, the control unit can operate the computation unit for images input at a time interval shorter than a predetermined time corresponding to each image input at an interval of a predetermined number of images when the input images are continuously shot or captured as moving pictures.

In the image compression apparatus with the above-mentioned configuration, if input images are continuously shot or captured as moving pictures, the quantization parameters are intermittently computed and updated. Therefore, the speeds of continuous shooting and moving pictures are not limited, and the compression process can be performed with reduced image degradation.

It is desired that the above-mentioned image compression apparatus is configured to be incorporated into a digital camera.

With the above-mentioned configuration, an image compression apparatus is provided having the function of performing a compression process without restrictions on the speeds of continuous shooting and moving picture shooting with reduced image degradation.

Furthermore, another aspect of the first aspects of the present invention is an image compressing method for compressing an input image according to a quantization parameter. Trial compression is performed on each input image for an image input at a time interval longer than a predetermined time, thereby computing each quantization parameter corresponding to each input image, and trial compression is performed on images input at an interval of a predetermined number of images whenever the image is input, for an image input at a time interval shorter than a predetermined time, thereby computing the quantization parameter. Thus, the input images are compressed according to each computed quantization parameter corresponding to each input image.

As described above, in the image compressing method with the above-mentioned configuration, the style of updating the quantization parameter can be changed depending on the input time interval of input images. Therefore, an image compressing method for appropriately compressing input images corresponding to the input style of input images can be realized.

In another aspect of the first aspects of the present invention, an image compressing program is configured to direct a computer to perform the procedure of computing each quantization parameter by performing trial compression on each input image for the images input at a time interval longer than a predetermined time, and performing a compression process according to each computed quantization parameter corresponding to each input image, and the procedure of computing each quantization parameter by performing trial compression on each input image at an interval of a predetermined number of images, whenever the images are input, for the images input at a time interval shorter than a predetermined time, and performing a compression process according to each computed quantization parameter corresponding to each input image.

With the above-mentioned configuration, an image compressing program capable of appropriately compressing input images corresponding to the input style of input images by changing the style of updating the quantization parameter depending on the input time interval of input images can be realized.

Examples of the embodiments to which the above-mentioned image compressing technology is applied are described below by referring to the accompanying drawings.

FIG. 2 is a block diagram showing the configuration of a digital camera which is one of the image compression apparatuses to which the above-mentioned image compressing technology is applied.

In FIG. 2, reference numeral 1 denotes a lens. A subject image is processed in an optoelectronic conversion by an image pickup device 2 such as a CCD, etc. through the lens 1, an image signal from the image pickup device 2 is analog-to-digital converted by an A/D converter 3, and stored in captured image memory 4. An image processing unit 8 performs an image compression process by a JPEG system, etc. for image data stored in captured image memory 4, and comprises: a YC converter 9 for converting RGB image data into a YC signal; a resizing unit 10 for resizing the YC-converted image data; a DCT arithmetic unit 11 for computing a DCT coefficient by performing an arithmetic process; a quantizing unit 12 for performing a quantization (linear quantization) process on a DCT coefficient corresponding to each frequency component; and a coding unit 13 for generating compressed data by entropy code processing using a Huffman code on a quantized value. Then, the image data compressed by the image processing unit 8 is stored in recorded memory 14, and is recorded on the external memory card 15 (removable record medium) such as Smart-Media, etc.

On the other hand, the image data resized by the image processing unit 8 is also stored in display memory 5, converted into an analog signal by a D/A converter 6, and displayed on a display unit 7 such as an LCD, etc. A control unit 16 is formed by a CPU, etc., and comprises quantization parameter storage memory 17 and a quantization parameter computation unit 18 for computing a quantization parameter used in the quantizing unit 12, and computes a quantization parameter by performing trial compression on a shot image at a predetermined image interval, thereby storing and updating the computed quantization parameter.

Figure 3:
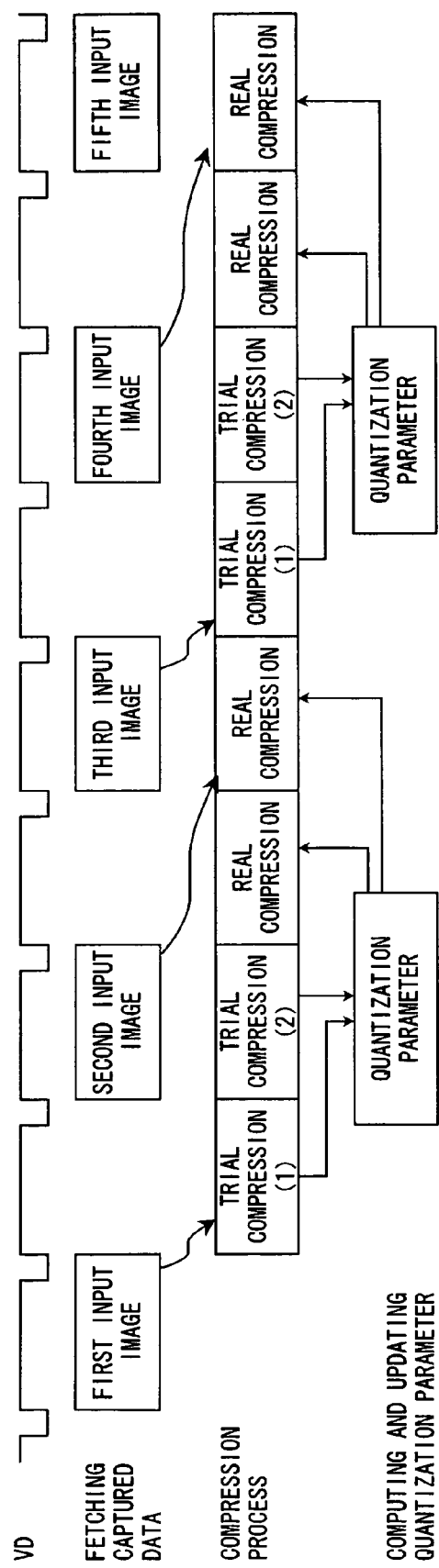
FIG. 3 is a timing chart of the image compression process of the digital camera to which the image compression apparatus according to the present invention is applied.

Described below is the first aspect of the processing operation of the image compression apparatus with the above-mentioned configuration. The timing chart shown in FIG. 3 is based on the vertical synchronizing signal VD, and shows fetching captured data and the compressing timing of the fetched image data. First, in FIG. 3, if the image interval for updating of a quantization parameter, that is, the number of update images, is set to 2, and the number of times of trial compression is 2, then the operation of the image compressing process can be described as follows. As shown in FIG. 3, the trial compression is performed twice on the first input image fetched as image data, the quantization parameter computation unit 18 computes the target quantization parameter as in the conventional method, the quantization parameter is stored in the quantization parameter storage memory 17, the compression process is performed by the quantizing unit 12 and the coding unit 13 respectively performing the quantization process and the coding process on the first input image according to the quantization parameter. Then, using the same stored quantization parameter, the compression process is performed on the next, i.e., second, input image. Then, the trial compression is performed twice on the third input image to newly compute a quantization parameter, the stored latest quantization parameter is updated, and, both the third and the fourth input images, are compressed according to the updated parameter. Similarly, the quantization parameter is updated and the compression process is continued for every two input images. In this method, the trial compression is twice performed to compute a quantization parameter, but it can be computed by performing the trial compression once.

Then, the operations of the control unit 16 normally performed when the number of input images for newly computing a quantization parameter is set to N (positive integer) are described below by referring to FIG. 4. When the first shot image is input, the counter for counting the number of input images for updating a quantization parameter which are arranged in the control unit 16 is set to 1 (S1). Then, it is determined whether or not the count value of the counter is 1 (S2). At this time, since the count value is 1, the trial compression is performed on the input image, the quantization parameter computation unit 18 computes a quantization parameter (S3), and the computed quantization parameter is stored in the quantization parameter storage memory 17 (S4).

Then, according to the stored quantization parameters, the real compression is performed by performing the compression process and the coding process respectively by the quantizing unit 12 and the coding unit 13, and the coded compressed data is output (S6). Then, it is determined (S7) whether or not the capturing has been completed and the input images have been completely fetched. If the capturing has been completed, the compression process terminates.

If the capturing continues, it is determined (S8) whether or not the count value of the counter has reached N. In this example, the count value is 1, and has not reached N. Therefore, 1 is added to the count value of the counter (S9), and control is returned to step S2. In step S2, it is determined again whether or not the count value is 1. In this example, the count value is 2. Therefore, the quantization parameter stored in the process at step S4 is read (S5), and the real compression is performed using the stored quantization parameter (S6). If the capturing continues (S7), then it is determined in step S8 whether or not the count value of the counter is N. If the count value has not reached the preset value N, then 1 is added to the count value (S9), control is returned to step S2, and the above-mentioned processing operations are repeated.

If the count value of the counter has reached N, then the count value is reset to 1 (S10), control is returned to step S2, the trial compression is performed on the input image at that time to compute a new quantization parameter, and the real compression is performed according to the updated quantization parameter, thereby updating a quantization parameter for every N input images and performing a compression process.

The aspect of the second compression processing operation is described below by referring to the flowchart shown in FIG. 5. In this operation, the record mode can be entered from the operation unit shown in FIG. 2, and the number N of updated images for a quantization parameter can be changed depending on the set recording mode. That is, first, a determination is made on the set record mode (S11). In a single image shooting mode, shot images are input at long time intervals, it is considered that scenes have been largely changed between shot images input at long time intervals, N is set to 1 (N=1), a quantization parameter is computed each time a shot image is input so that the compression process can be performed using each quantization parameter (S12). On the other hand, in a continuous image shooting mode, shot images are input at short time intervals, it is considered that scenes have not been largely changed between shot images input at short time intervals, N is set to 5 (N=5) and the compression process is performed using the same quantization parameter as far as possible so that the compression processing time is not much extended (S13). In the moving picture mode, since a moving picture size is small, a long compression processing time is not required. Therefore, N is set to 2 (N=2), and the compression process is performed while suppressing image degradation (S14).

Thus, an appropriate compression process can be performed corresponding to the style of input images in the record mode with the number of updated images changed for a quantization parameter corresponding to the record mode.

Thus, according to the first aspect of the present invention, a compression process is performed by computing a new quantization parameter by performing trial compression on the images input at an interval of a predetermined number of images. On the other images, the compression process is performed using the latest stored quantization parameter, thereby updating the quantization parameter at an interval of a predetermined number of images, thereby reducing image degradation, and realizing the image compression apparatus capable of quickly performing an efficient compression process.

Furthermore, an efficient compression process can be quickly performed with image degradation reduced on moving pictures.

Additionally, an efficient compression process can be quickly performed with image degradation reduced on continuously shot images.

Furthermore, trial compression is performed on the images input at an interval of a predetermined number of images to compute a new quantization parameter, thereby performing a compression process. On the other images, the compression process is performed using the latest stored quantization parameter. Therefore, an image compressing method can be realized with image degradation reduced, and an efficient compression process quickly performed by updating the quantization parameter at an interval of a predetermined number of images.

Additionally, an image compressing program can be realized with image degradation reduced, and an efficient compression process quickly performed by updating the quantization parameter at an interval of a predetermined number of images.

Furthermore, since the update style is changed corresponding to the input time interval of input images, an appropriate compression process can be performed corresponding to the input style of input images.

Additionally, since the latest quantization parameter is used on an input image for which a quantization parameter is not computed, a quantization parameter having a smaller difference can be used, thereby reducing image degradation.

When input images are continuously shot images or moving pictures, quantization parameters are intermittently computed and updated. Therefore, the compression process can be performed with image degradation reduced and without limiting the speeds of continuous shooting or shooting moving pictures.

Furthermore, an image compression apparatus having the function of performing a compression process with image degradation reduced and without limiting the speeds of continuous shooting or shooting moving pictures can be realized.

Additionally, since the style of updating a quantization parameter is changed depending on the input time interval of input images, an image compressing method for appropriately performing a compression process corresponding to the input style of input images can be realized.

Furthermore, an image compressing program capable of performing an appropriate compression process corresponding to the input style of input images with the style of updating a quantization parameter changed corresponding to the input time interval of input images can be realized.

Described below is the second aspect of the present invention.

One second aspect of the present invention is configured by: a capture unit for obtaining an electronic image of a subject by capturing the subject through a shooting optic system; an image processing unit for generating digital image data by processing a signal output from the capture unit; a reduction unit for performing a compression process or a thinning process on the image data output from the image processing unit; and a communications unit for transmitting the image data to an external device. With the above-mentioned configuration, the reduction unit determines the compression rate of the image data before inputting a capture designation signal higher than that after the input of the capture designation signal, or determines an amount of thinning of the image data before the input of the capture designation signal larger than that after the input of the capture designation signal.

Another second aspect of the present invention is a camera system for transmitting image data captured by a camera to an external device, and storing and displaying the data on the external device in which the camera transmits data after processing the data such that the amount of image data for display can be smaller than the amount of image data for storage. Additionally, the camera system has an external device comprising a display unit for displaying image data captured by the camera, a storage unit for storing the image data captured by the camera, and a communications unit capable of communicating with the camera. The storage unit stores data only when it receives from the communications unit image data having a lower compression rate or having a smaller amount of thinned data compared to the image data for display. Furthermore, the external device performs either a displaying operation or a storing operation on the image data by identifying the image data transmitted from the camera. Additionally, the external device performs either a displaying operation or a storing operation on the image data corresponding to the amount of image data transmitted from the camera.

A further second aspect of the present invention is a camera in which image data for display is transmitted by wireless means to an external device before inputting a capture designation signal, and image data for storage is transmitted by wireless means to the external device after inputting a capture designation signal. The amount of transmission data is different before and after inputting a capture designation signal.

An example of an embodiment of the above-mentioned camera and camera system is described below in detail by referring to the attached drawings.

FIG. 6 is a back view from obliquely left and above the camera according to the present invention.

FIG. 7 is an oblique view of the external device provided as a pair to the camera shown in FIG. 6 to configure the above-mentioned camera system.

As shown in FIGS. 6 and 7, the camera system is configured by a digital camera (hereinafter referred to also as a camera) 21 for capturing a subject by forming an image of a subject on an image pickup device such as a CCD, etc. by a shooting optical system, and an external device 31 for communicating information by communicating with the digital camera 21.

The digital camera 21 is configured by a shooting lens 22 for forming an image of a subject on a photoreceiving surface of the image pickup device, an antenna 23 for communicating by wireless means each type of information including captured images, a releasing button 24 for designating and inputting a shooting operation, and an optical finder 25.

The external device 31 is configured by a display device 32 comprising a liquid crystal monitor, etc. for display of various information about an electric image, etc., an antenna 34 for communicating by wireless means with the digital camera 21, a memory card 36 comprising, for example, flash memory, etc., a card insertion portion 35 for mounting as freely attaching and removing the memory card, operation buttons 37 including a button for issuing display designation, and a remote control button 38 for allowing the digital camera 21 to perform a releasing operation.

In the camera and camera system with the above-mentioned configuration, the following three types of shooting methods can be used.

(1) normally performing a shooting process by pressing the releasing button 24 after determining the composition of a subject viewed through the optical finder 25.

(2) no-finder shooting by pressing the releasing button 24 while viewing a subject image displayed on the display device 32 without the optical finder 25.

(3) remotely controlled shooting by allowing a camera to perform a shooting operation by pressing the remote control button 38 while viewing a subject image displayed on the display device 32 without the optical finder 25.

The above-mentioned three shooting methods are not specifically set, but normal shooting can be performed by a shooter directly pressing the releasing button 24, remotely controlled shooting can be performed by a shooter pressing the remote control button 38 instead of the releasing button 24, and no-finder shooting can be performed by setting the display device 32 in a display state by operating the operation buttons 37 and pressing the releasing button 24.

Described below is the internal configuration and the operation of the digital camera 21.

Figure 8:
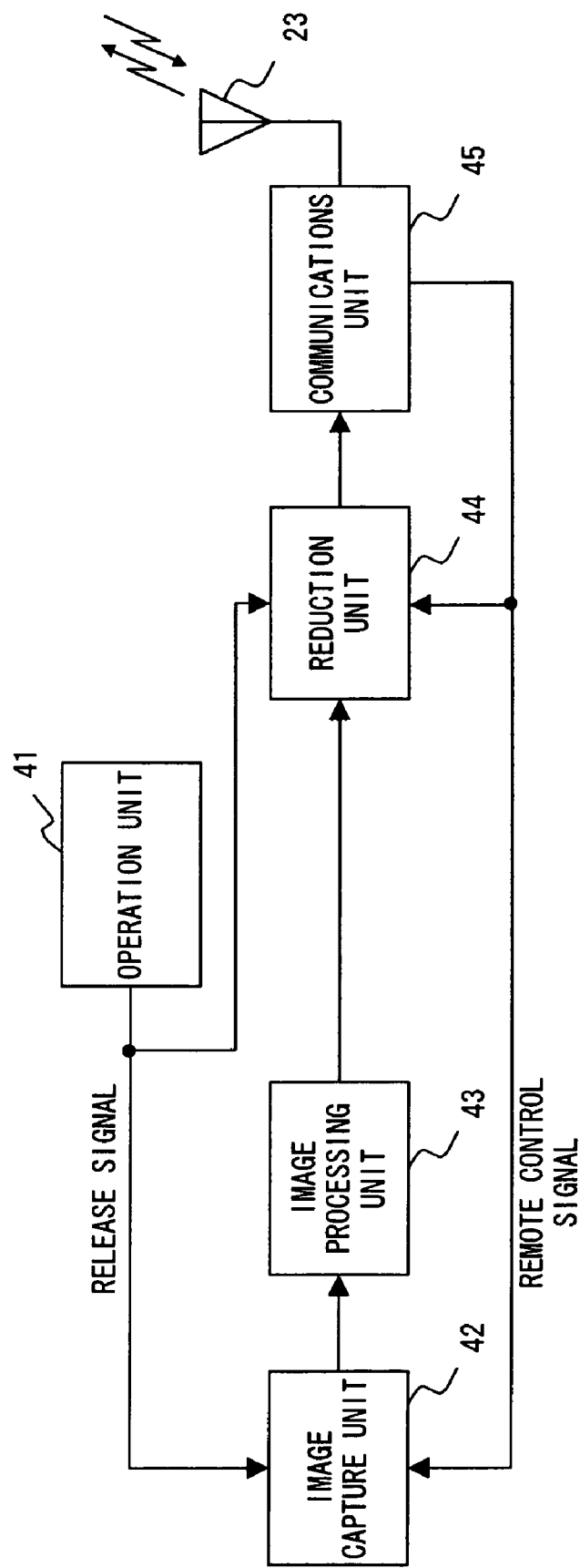
FIG. 8 is a block diagram of the configuration of the electric circuit of the camera shown in FIG. 6.

FIG. 8 is a block diagram showing the configuration of the electric circuit of the digital camera 21.

As shown in FIG. 8, the digital camera 21 is configured by an operation unit 41, a image capture unit 42, an image processing unit 43, a reduction unit 44, and a communications unit 45.

The output terminal of the operation unit 41 is connected to the input terminal of the image capture unit 42 and the input terminal of the reduction unit 44. The output terminal of the image capture unit 42 is connected to the input terminal of the image processing unit 43.

The output terminal of the image processing unit 43 is connected to the input terminal of the reduction unit 44, and the output terminal of the reduction unit 44 is connected to the input terminal of the communications unit 45.

The output terminal of the communications unit 45 is connected to the antenna 23 for wireless communications with a communications unit 51 (refer to FIG. 9) of the external device 31 described later, the input terminal of the image capture unit 42, and the input terminal of the reduction unit 44.

The operation unit 41 is used to manually input various operations by a shooter, configured by the releasing button 24 and other buttons (not shown in the attached drawings)

provided on the surface of the digital camera 21, and outputs a release signal to the image capture unit 42 when the releasing button 24 is pressed.

The image capture unit 42 is configured by the shooting lens 22, the image pickup device, etc. not shown in the attached drawings. When the power switch (not shown in the attached drawings) of the digital camera 21 is turned on, the capturing operation is continuously performed, an image is captured to store a subject image in the storage unit described later according to the release signal from the operation unit 41, and is output to the image processing unit 43.

The image processing unit 43 is configured by an A/D conversion circuit a digital signal processing circuit, etc., converts an output signal from the image capture unit 42 into digital data through the A/D conversion circuit, performs predetermined image processing such as adjustments of brightness, color balance, etc. on the image data digitized by the A/D conversion circuit through the digital signal processing circuit, and outputs the resultant data to the reduction unit 44.

The reduction unit 44 has a compression circuit for compressing the image data output from the image processing unit 43 in the well-known JPEG system, and outputs the compressed image data to the communications unit 45.

The communications unit 45 has the antenna 23 as a component, transmits the image data compressed by the reduction unit 44 to the external device 31 described later, and receives a remote control signal from the external device 31.

The reduction unit 44 has the function of changing the compression rate of image data according to the release signal output by pressing the releasing button 24 or the remote control signal from the external device 31. Practically, until the release signal is received from the operation unit 41 by pressing the releasing button 24 or until the remote control signal from the external device 31 is received from the communications unit 45, the image data output from the image processing unit 43 is compressed with high compression rate settings (for a smaller amount of data). On the other hand, after receiving the release signal or the remote control signal (capture designation signal), the image data is compressed with low compression rate settings (for high-precision images). Thus, the image data compressed by the reduction unit 44 is transmitted to the external device 31 at any time by the communications unit 45.

The compression rate of the reduction unit 44 is changed depending on the situation because image data is used for preliminary checking the display until the release signal or the remote control signal is received. Therefore, the amount of image data is kept smaller for a higher communications speed. After receiving the release signal or the remote control signal, the image data is stored. Therefore, it is considered that compression rate is to be lower for high-precision images.

Figure 9:
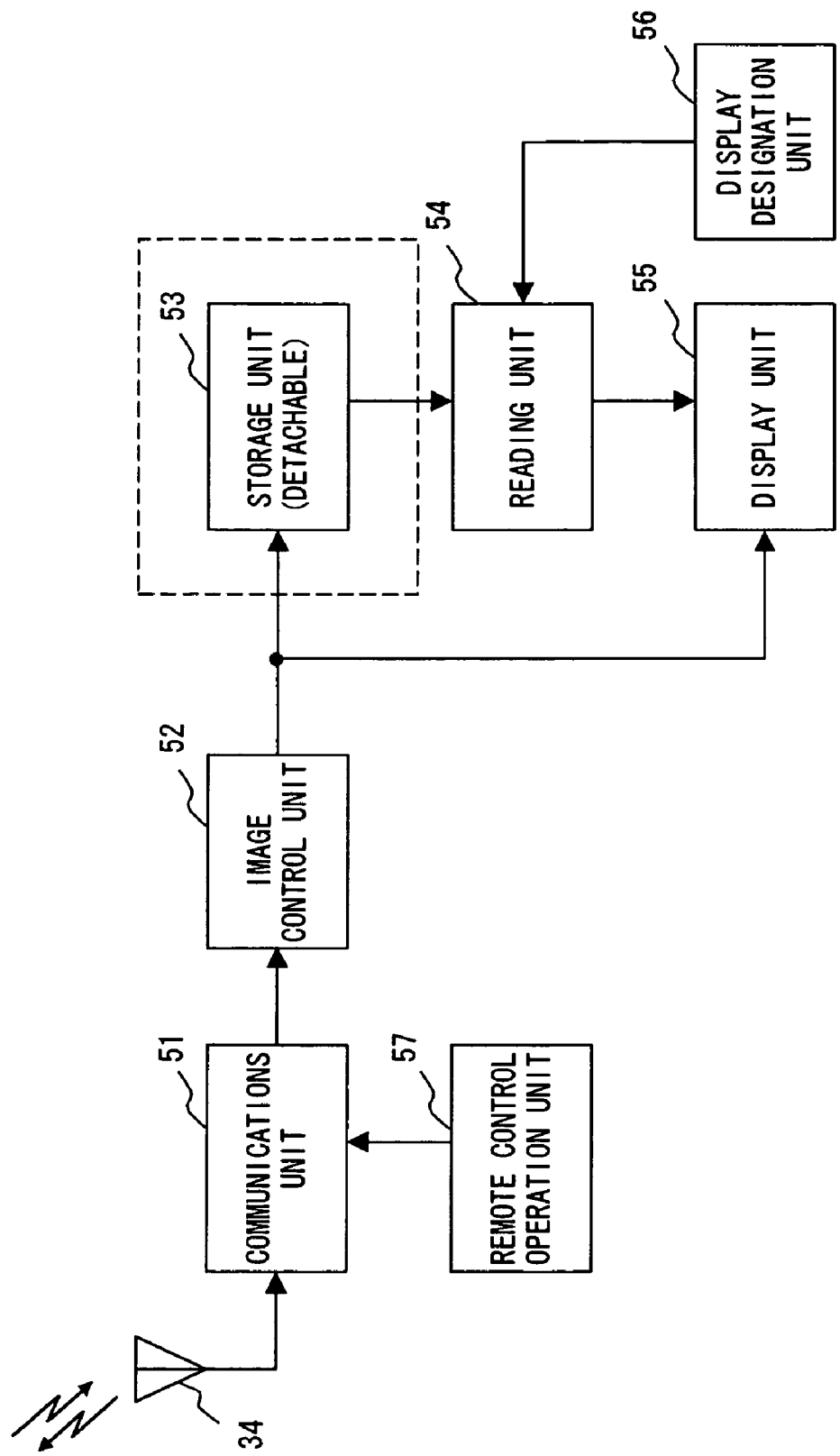
FIG. 9 is a block diagram of the configuration of the electric circuit of the external device shown in FIG. 7.

Described below is the internal configuration and operations of the external device 31. FIG. 9 is a block diagram of the configuration of the electric circuit of the external device in the camera system according to an embodiment of the present invention.

As shown in FIG. 9, the external device 31 has the functions of remotely controlling operations, storing images, and displaying images, and comprises the communications unit 51, an image control unit 52, a storage unit (detachable) 53, a reading unit 54, a display unit 55, a display designation unit 56, and a remote control operation unit 57. The communications unit 45 (refer to FIG. 8) of the digital camera 21, the antenna 34 for wireless communications, and the output terminal of the remote control operation unit 57 are connected to the input terminal of the communications unit 51. The output terminal of the communications unit 51 is connected to the input terminal of the image control unit 52, and the output terminal of the image control unit 52 is connected to the input terminal of the storage unit 53 and the input terminal of the display unit 55. The output terminal of the storage unit 53 and the output terminal of the display designation unit 56 are connected to the input terminal of the reading unit 54. Furthermore, the output terminal of the reading unit 54 is connected to the input terminal of the display unit 55.

The communications unit 51, which has the antenna 34 as a component, receives image data transmitted by wireless means from the digital camera 21, outputs it to the image control unit 52, and transmits a remote control signal from the remote control operation unit 57 by pressing the remote control button 38 described later.

The image control unit 52, which controls the image data received by the communications unit 51 to be output for storage in the storage unit 53, outputs the image data to the display unit 55 described later for direct display.

The storage unit 53 comprises the card insertion portion 35, the memory card 36 (refer to FIG. 7) mounted on the card insertion portion 35 as freely detachable, and stores the image data by the control of the image control unit 52.

The reading unit 54 reads the image data stored in the storage unit 53 by the instruction of the display designation unit 56 described later, and outputs it to the display unit 55.

The display unit 55 displays the image data read by the reading unit 54, or the image data directly output from the image control unit 52, and corresponds to the display device 32 (refer to FIG. 7).

The display designation unit 56 inputs a designation signal for display of an image on the display unit 55, and corresponds to the operation button 37.

In response to the pressing operation from the remote control button 38 (refer to FIG. 7), the remote control operation unit 57 outputs the information to the communications unit 51 and transmits a remote control signal to the digital camera 21.

The image control unit 52 switches the operation of storing the image data output from the communications unit 51 in the storage unit 53 and the operation of displaying it on the display unit 55, and the switching control is determined based on the amount of image data. That is, the amount of received image data is compared with a prescribed predetermined value. If it exceeds the predetermined value, the data is determined as image data for storage. If it is smaller than the predetermined value, it is determined as image data for display.

Therefore, if it is determined that the data is image data for storage, the image data transmitted to and stored in the storage unit 53. If it is determined that the data is image data for display, then it is transmitted to the display unit 55, and displayed in a visible state.

Therefore, although the shooter is not aware of it, the external device 31 automatically and appropriately distributes the transmitted data.

Described below is the general operations of the digital camera 21.

Figure 10:
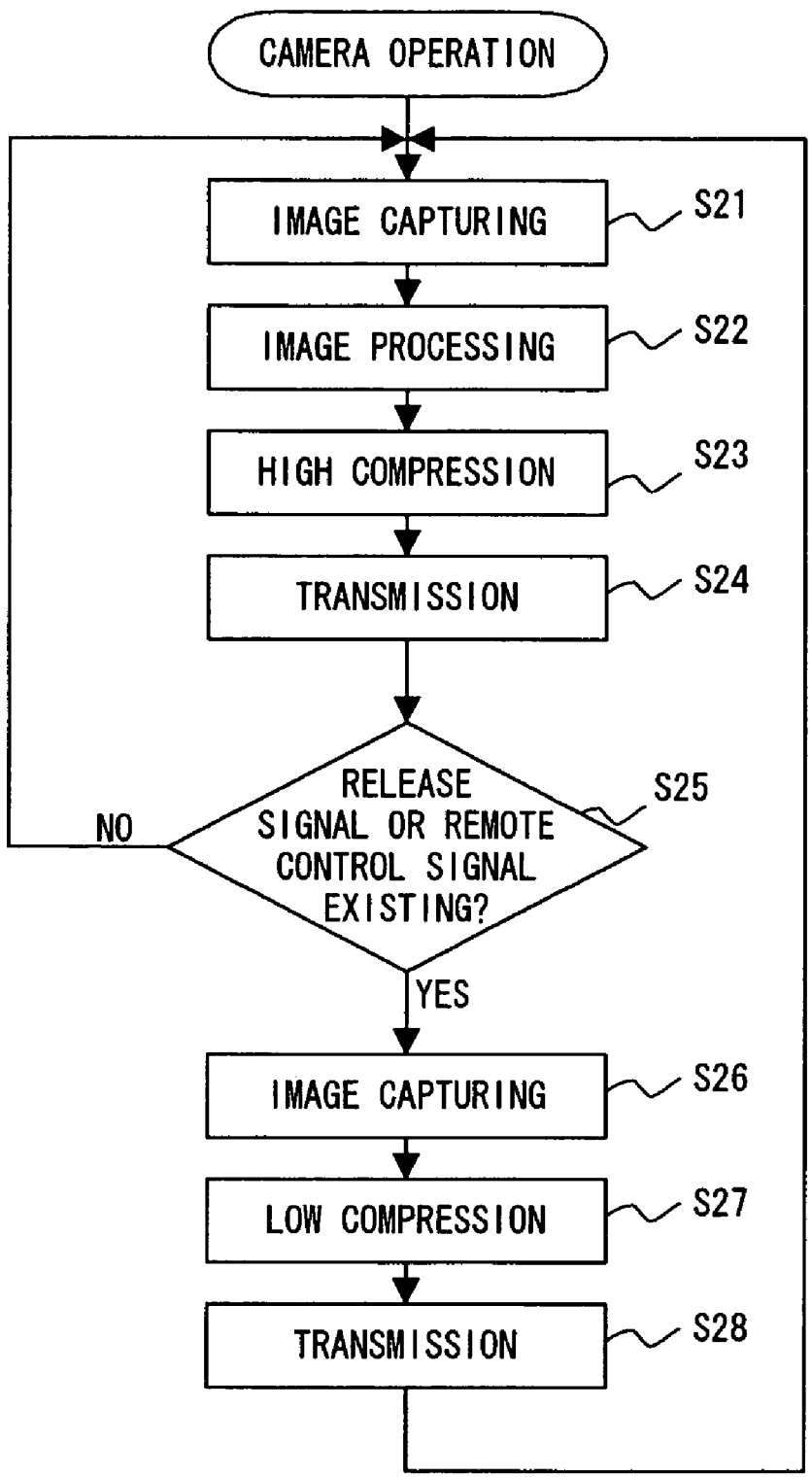
FIG. 10 shows the flow of the operations of the camera shown in FIG. 6.

FIG. 10 is a flowchart of the detailed operations of the digital camera 21.

As shown in FIG. 10, when the initialization terminates after turning on the power switch, the digital camera 21 performs a image capturing operation through the image capture unit 42 in step S21, and control is passed to step S22. In step S22, the image processing unit 43 performs predetermined image processing on the image data obtained in the image capturing operation, and control is passed to step S23.

In step S23, the reduction unit 44 compresses the image data processed in step S22 at a high compression rate, and control is passed to step S24. In step S24, the image data compressed in step S23 at a high compression rate is transmitted by the communications unit 45 to the external device 31, and control is passed to step S25.

Then, in step S25, it is determined whether a release signal has been input by pressing the releasing button 24, or a remote control signal from the external device 31 has been input through the communications unit 45. If it is determined in step S25 that neither the release signal nor the remote control signal has been input, control is returned to step S21, and the operations from step S21 to step S24 are repeated, and the image capturing operation is repeatedly performed. If it is determined that the release signal or the remote control signal has been input, then control is passed to step S26, and the image capturing operation is performed to obtain image data for storage.

If the image capturing operation is performed in step S26, control is passed to step S27, the captured image data is converted into high-precision image data by compressing the image data at a low compression rate by the reduction unit 44, control is passed to step S28, and the communications unit 45 transmits the data to the external device 31 in step S28. Then, control is returned to step S21.

The digital camera 21 repeats the operations in steps S21 through S28 during power-up.

Described below are the general operations of the external device 31.

FIG. 11 is a detailed flowchart of the operations of the external device.

As shown in FIG. 11, the communications unit 51 receives the image data transmitted from the digital camera 21 in step S29, control is passed to step S30, and it is determined in step S30 whether or not the amount of data received by the image control unit 52 exceeds the prescribed predetermined value. If it is determined in step S30 that the predetermined value is exceeded, control is passed to step S31, the storage unit 53 stores the data, and then control is passed to step S33. If it is determined that the predetermined value is not exceeded, control is branched to step S32, the display unit 55 displays the image, and control is passed to step S33.

Then, in step S33, it is determined whether or not the operation button 37 has been pressed. If yes, control is passed to step S34, the reading unit 54 reads the image stored in the storage unit 53 in the display subroutine, the operations displayed on the display unit 55 are performed, and control is passed to step S35. On the other hand, unless the operation button 37 is pressed in step S33, control is jumped to step S35.

Then, it is determined in step S35 whether or not the remote control button 38 has been pressed. If yes, control is passed to step S36, the remote control signal (release signal) is transmitted to the digital camera 21 through the communications unit 51, and control is returned to step S29. On the other hand, if it is determined in step S35 that the remote control button 38 has not been pressed, then control is returned to step S29.

The external device 31 repeats the operations in steps S29 through S36 during power-up Thus, in the above-mentioned camera and camera system, if the image data is to be checked, then the built-in reduction unit 44 of the digital camera 21 performs a compression process on the image data with the settings at a high compression rate (for smaller amount of data), if the image data is to be stored, then the built-in reduction unit 44 of the digital camera 21 performs a compression process on the image data with the settings at a low compression rate (for high-precision images), and the communications unit 45 transmits the image data to the external device 31. Since the built-in image control unit 52 of the external device 31 automatically determines whether the image data is to be stored in the built-in storage unit 53 or to be displayed on the display unit 55 according to the compression rate of the image data transmitted by the communications unit 45, the communications time between the digital camera 21 and the external device 31 can be shortened when the composition, etc. of the captured image is checked by an external device, thereby ensuring the display of smooth moving pictures. When image data for storage is checked, the communications time can also be shortened for high-precision image data because the data is compressed.

In the above-mentioned camera 21, the amount of image data is varied by changing the compression rate of the JPEG compression in the reduction unit 44. However, the compressing method is not limited to this application, but it is obvious that the image data can be thinned and compressed. In this case, the amount of data can be reduced by increasing the amount of thinned data until the capture designation signal is input, and the amount of thinned data can be reduced after inputting the capture designation signal.

Furthermore, since the digital camera 21 transfers the captured image data to the external device 31 without storing it in the digital camera 21, the configuration of the digital camera 21 can be simple. However, in the case where the communications fail, the problem of data loss can occur.

Figure 12:
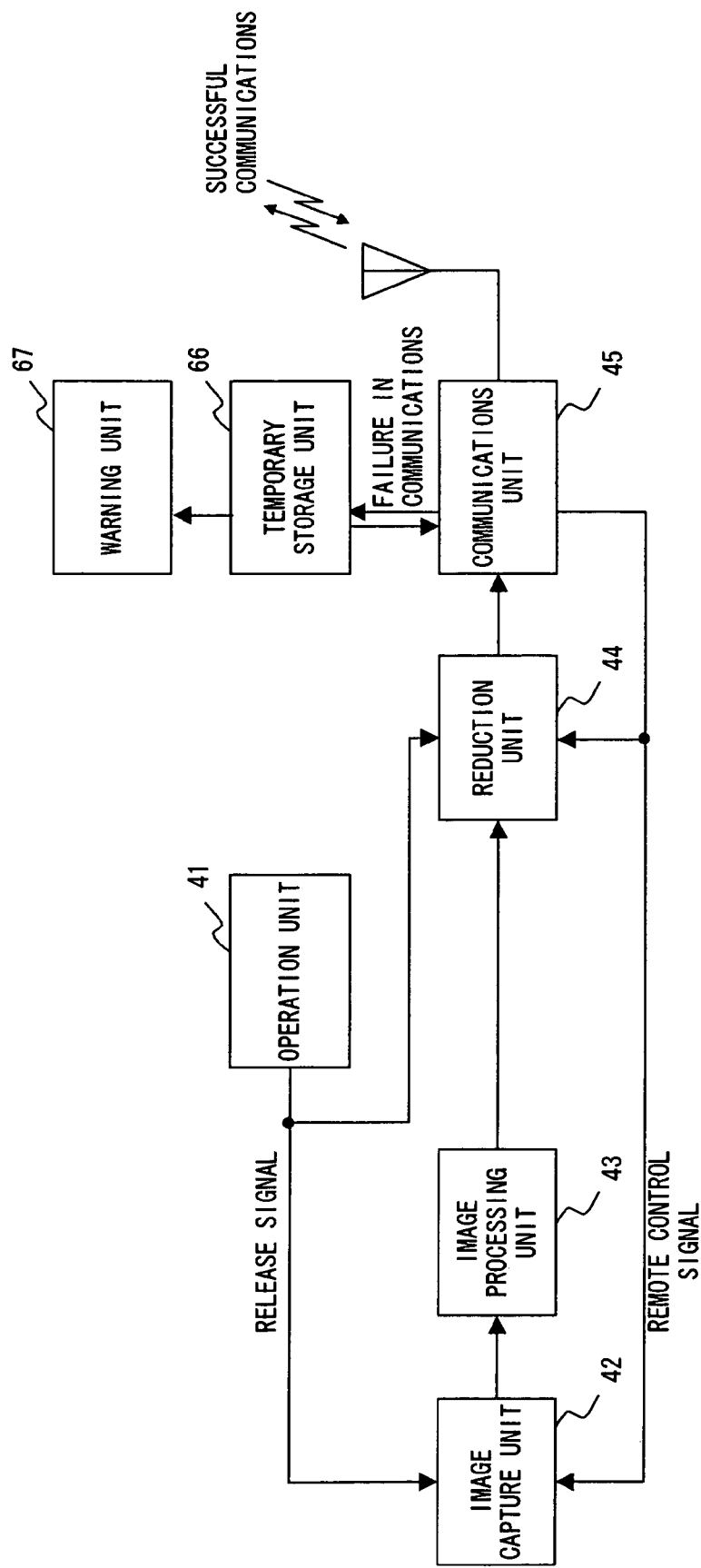
FIG. 12 is a block diagram of the configuration of the electric circuit having a built-in temporary storage unit and warning unit in the camera shown in FIG. 6.

Therefore, to solve this problem, a temporary storage unit 66 comprising small-capacity memory can be provided, as shown in FIG. 12, in the digital camera 21 so that the temporary storage unit 66 can temporarily store image data in case the communications fail. Furthermore, the digital camera 21 can contain, as shown in FIG. 12, a warning unit 67 so that the shooter can be notified of the failure of the communications by displaying a warning on the warning unit 67 after the failure of the communications occurs and the data is stored in the temporary storage unit 66.

Furthermore, the external device 31 determines whether the image data is to be stored or displayed depending on the amount of image data transmitted from the body of the camera 1. However, the body of the camera 1 can assign an identification code when the image data is transmitted, and the external device can discriminate the identification code to determine the type of image data.

As described above, the second aspect of the present invention can provide a camera and a camera system capable of checking by the external device the displayed images as smoothly moving pictures before the shooting operation, and storing high-precision image data during the shooting operation.

Described below are the third aspects of the present invention.

One of the third aspects of the present invention is an image regeneration apparatus, which regenerates image data of at least the image data group in the image data group including representative image data and plural pieces of image data associated with the representative image data or a single piece of image data, provided by a built-in recording medium of the apparatus or a recording medium mounted on the apparatus, includes: a temporary storage unit for temporarily storing at least one piece of representative image data in the representative image data and the image data group, or the single piece of image data; an image selection unit for selecting a piece of image data as an image to be displayed from the temporarily stored representative image data or a single piece of image data; a reproduction designation unit for designating for regeneration of an image data group associated with selected representative image data when the representative image data is selected by the image selection unit; and a storage control unit for controlling the image data of the image data group to be temporarily stored in the temporary storage unit before the regeneration of the image data group by the designation for regeneration.

The image data group can be a group of image data configuring moving pictures.

With the above-mentioned configuration, the image data group of selected representative image data can be read by a temporary storage unit before regeneration of the image data group by the designation for regeneration.

If frame information about the date and time and the shooting order is added to each piece of image data of the representative image data and the single piece of image data, then image data can be selected based on the date and the shooting order.

Furthermore, the temporary storage unit can be configured to include a first storage area for temporarily storing image data selected by the image selection unit and a single piece of image data or representative image data in the image selecting order before and after the image data (the order of image data selected by the image selection unit) and a second storage area for temporarily storing a single piece of image data or representative image data excluding the image data temporarily stored in the first storage area, or the image data group associated with the representative image data temporarily stored in the first storage area. In the configuration, each piece of image data of the representative image data and the single piece of image data includes frame information relating to the date and time or shooting order, and the storage control unit controls storing of the representative image data selected by the image selection unit and a single piece of image data or representative image data having the frame information adjacent to the representative image data in the first storage area, and controls storing of the image data group associated with the selected representative image data in the second storage area, prior to the regeneration of the image data group by the designation for regeneration.

With the above-mentioned configuration, the image data selected by the image selection unit and the image data before or after the above-mentioned image data in the image selecting order can be reserved in a predetermined storage area of the temporary storage unit, and the other storage areas can be read according to priority using the image data or the image data group related to the selected image data in the above-mentioned configuration at the preceding stage. The image data selected by the image selection unit and the adjacent image data based on the date and time and the shooting order added to each piece of image data can be reserved in a predetermined storage area of the temporary storage unit. Furthermore, the image data group of the representative image data can be read by priority among other storage areas if the selected image data is representative image data in the above-mentioned configuration at the subsequent stage.

Another of the third aspects is an image regeneration apparatus which displays at least the representative image data or any of a single piece of image data, in an image data group including the representative image data and plural pieces of image data related to the representative image data, or in the single piece of image data, and comprises: a temporary storage unit for temporarily storing at least the representative image data or any of a single piece of image data in the representative image data, the image data group, or the single piece of image data; an image selection unit for selecting a piece of image data as an image to be displayed from the temporarily stored representative image data or a piece of image data; and a storage control unit for controlling the storage of data using an image data group related to the selected image data or the image data related by making a predetermined determination with the selected image data for a specified storage area by specifying a storage area having a predetermined priority from a storage area of the temporary storage unit depending on whether the type of selected image data is representative image data or a piece of image data.

With the above-mentioned configuration, the image data related to the selected image data can be constantly and temporarily stored in the temporary storage unit. Therefore, for example, the image data can be smoothly selected by the regeneration and a predetermined determination. Furthermore, the above-mentioned temporary storing method can be based on, for example, the priority such as the frame number order, the shooting order, etc. provided in or assigned to the temporary storage unit.

Each piece of image data of the representative image data and the single piece of image data includes frame information relating to the date and time or a shooting order, and the storage control unit can control the storage of a representative image data or a piece of image data adjacent relative to the frame information of the selected image data, in a storage area having a high selection priority in selecting order viewed from the selected image data.

With the above-mentioned configuration, the image data adjacent in frame number order or shooting order to the selected image data is always stored in a storage area having a higher selection priority order.

Furthermore, when the selected image data is representative image data, the storage control unit can control the storage such that the image data group associated with the representative image data can be stored in the regenerating order of the image data group in the storage area having a lower selection priority order.

With the above-mentioned configuration, the higher the selection priority order of a storage area, the lower the order of storage control in the image data group.

Furthermore, each piece of image data of the representative image data and the single piece of image data comprises frame information about the date and time or the shooting order, and when the selected image data is a piece of image data, the storage control unit can be configured to control the storage such that a piece of image data or representative image data in a selecting order according to the frame information can be sequentially stored in a storage area having a higher selection priority order.

With the above-mentioned configuration, a storage area having a high selection priority order stores image data having a selecting order according to the frame information.

An example of an embodiment of the image regeneration apparatus is described below in detail by referring to the attached drawings.

Figure 13A:
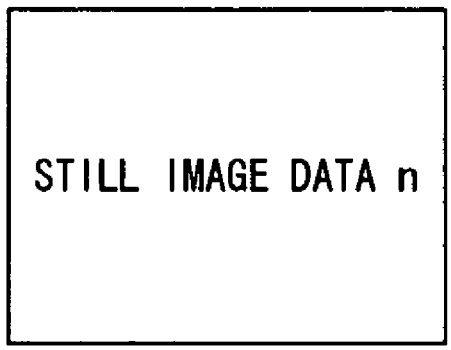
FIG. 13A shows the configuration of still image data processed in an embodiment of the image regeneration apparatus of the present invention.
Figure 13B:
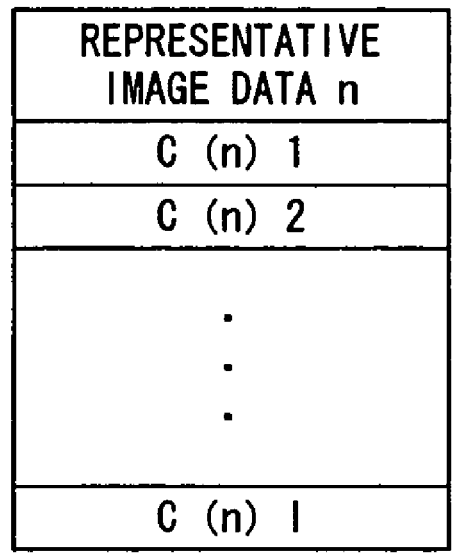
FIG. 13B shows the configuration of the moving picture data processed in an embodiment of the image regeneration apparatus of the present invention.

FIGS. 13A and 13B show each type of configuration of digital data processed by the image regeneration apparatus according to an embodiment of the present invention.

The type of data shown in FIG. 13A is still image data (a piece of image data). In FIG. 13A, data of the n-th (n is a natural number) identified still image among a plurality of still images is shown.

The type of data shown in FIG. 13B is moving picture data. FIG. 13B shows the image data representing the n-th identified moving picture data (representative image data) and the n-th identified moving picture data, comprising a plurality of chunks C(n), corresponding to the representative image data from a plurality of moving picture data.

A "chunk C(n)l" (l is a natural number) refers to a predetermined number of continuous frames of image data (frames) configuring moving picture data represented as a unit. FIG. 13B shows the chunk C(n)l in the regeneration order (order of 1 above).

Figure 13C:
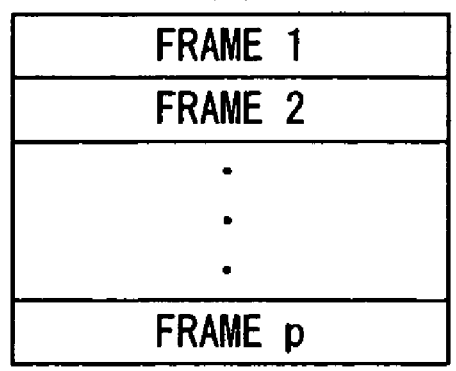
FIG. 13C shows the configuration of the chunk configured by the moving picture data shown in FIG. 13B.

FIG. 13C shows an example of a group C(n)1 of the frames 1 through p (p is a natural number) represented by the representative image data n, and the data is sequentially regenerated from the upper frame shown in FIG. 13C.

FIGS. 14A, 14B, and 14C show examples of managing the buffer memory performed in the image regeneration apparatus according to an embodiment of the present invention on the above-mentioned still image data and moving picture data.

FIG. 14A shows the concept of an example of a data array when still image data or representative image data (hereinafter referred to as image data for display) is read to the buffer memory.

In FIG. 14A, the image to be displayed on the display unit of the image regeneration apparatus is shown as enclosed by a frame comprised of bold lines. In the present embodiment, the image to be displayed is still image data n (n is a natural number).

Then, above and below the still image data n, the image data for display is sequentially arranged from the data adjacent to the still image data n in frame advance order. The frame advance order refers to the display order for display of image data for display on the display unit in a predetermined order, for example, the display order indicated according to the frame information such as the date and time, the shooting order, etc. added to the image data for display. In FIG. 14A, the frame number is shown as a combination of n and m (m is a natural number).

That is, in FIG. 14A, the frame number of the image data for display is downward counted in an ascending order. With regards to direction, the date and time of shot image data for display, for example, can be arranged from the oldest to the newest or in the reverse order.

Described below is the storage control method in the buffer memory based on the above-mentioned arrangements.

Assume that the display target is switched from the n-th still image data selected in the bold frame as a display target on the display unit to the (n+1)th image data for display in the close and forward direction of frames (moving downward as shown in FIG. 14A) at an instruction of, for example, the operation unit not shown in the attached drawings. At this time, when the newly selected image data for display n+1 is still image data, the farthest image data for display from the still image data n+1 in the frame advance order is deleted. Instead, the image data for display, that is closer to the still image data n+1 than the deleted image data for display in the frame advance order, is read to the data deleted storage area.

FIG. 14B shows each piece of image data read in the buffer memory after the display target is moved to the still image data n+1 arranged adjacent to the still image data n designated in FIG. 14A. As shown in FIG. 14B, as compared with FIG. 14A, the image data for display n−m which is the farthest in the arrangement in frame advance order from the still image data n+1 is deleted, and the image data for display n+m+1 (position of Y1 in FIG. 14B) which is closer in the arrangement in frame advance order is newly read.

On the other hand, the selection is moved to the image data for display n+1 in the frame advance order from the n-th still image data selected in FIG. 14A, and the case of the image data for display as the representative image data of the moving picture data, not the still image data, is described below.

When the newly selected image data as a display target is representative image data, the representative image data n+1 and the closest still image data n and the image data for display n+2 in frame advance order are stored.

Then, the storage areas other than the storage areas storing the above-mentioned data are rewritten by the moving picture data represented by the representative image data n+1 in order from the farthest image data for display in arrangement of frame advance order relative to the representative image data n+1 selected as the display target.

FIG. 14C shows each piece of image data read in the buffer memory after the display target is moved to the representative image data n+1 arranged next to the still image data n specified in FIG. 14A.

As shown in FIG. 14C, the representative image data n+1, and the closest still image data n and image data for display n+2 are stored while rewriting the image data for display sequentially (in the order of Y1, Y2, Y3, Y4, . . . as shown in FIG. 14C. Although the order is shown as far as Y4 in FIG. 14C, the order continues in the arrow direction as far as the corresponding target, and the order is similarly processed subsequently) from the storage area of the image data for display shown in FIG. 14A arranged the farthest in frame advance order from the selected representative image data n+1 into the chunk of the moving picture data.

The leading and trailing image data for display in frame advance order, which is the image data for display to be read to the buffer memory, has adjacent data in frame advance order (that is, the frame after the last frame of image data for display is the leading frame of the image data for display), thereby configuring a ring buffer having no space in advance order of image data for display. Although not specifically described, the above-mentioned method can be used in the subsequent processes.

The storage control method used when representative image data is selected as an image to be displayed as shown in FIG. 14C is described below.

FIGS. 15A, 15B, and 15C show examples of the concepts of data arrays used when still image data or representative image data (hereinafter referred to also as image data for display) is read to the buffer memory.

FIG. 15A shows the data array used when image data for display and a chunk are read to the buffer memory. In FIG. 15A, the state of arranging each piece of representative image data in the frame advance order based on the image data for display (representative image data in this example) selected as a display target as in the state shown in FIG. 14C.

That is, in FIG. 15A, there are image data for display n−1 and image data for display n+1 closest in frame advance order above and below the central representative image data n selected as enclosed by bold lines. Furthermore, on both sides of these three pieces of image data for display, a chunk represented by the representative image data n which is a display target is read. The figure corresponds to FIG. 14C in which n is replaced with n−1.

The selection of a display target is transferred from the currently selected n-th representative image data to the (n+1)th image data for display. At this time, if the newly selected image data n+1 is still image data, the chunk read to the buffer memory is sequentially deleted from the storage area storing the latest chunk in the moving picture regeneration order. Then, the image data for display currently not in the buffer memory are sequentially read to the data deleted storage area.

That is, as shown by the order of Y1, Y2, Y3, Y4, . . . in FIG. 15B, the image data for display n+2, n+3, n+4, n−2, . . . is sequentially replaced with the chunk shown in FIG. 15A.

If the display target is transferred from the n-th representative image data selected as a display target in FIG. 15A, and the (n+1)th image data for display selected as a new display target is other representative image data, then storage areas of the representative image data n+1 and the closest representative image data n and image data for display n+2 in the frame advance order are reserved, and the image data not read yet can be read. In the other storage areas, the chunk of moving picture data represented by the representative image data n+1 are sequentially rewritten from the highest priority regenerating order.

That is, as shown by Y1, Y2, Y3, Y4, Y5, . . . in FIG. 15C, the representative image data n+1 and the closest representative image data n are stored while the storage area storing the latest chunk in the regenerating order in the moving picture data represented by the representative image data n is rewritten with the other closest image data for display n+2 opposite the representative image data n+1. Furthermore, sequentially from the storage area in which the second latest chunk in the regenerating order is stored, the higher order chunks in the regenerating order in the moving picture data represented by the representative image data n+1 are rewritten.

As described above, the chunks shown in FIG. 15C are those of moving picture data represented by the representative image data n+1, and are different from the chunks of the moving picture data represented by the representative image data n.

Thus, as the three pieces of image data, that is, the image data specified by the bold line frame and the closest two pieces of image data above and below the specified image data as shown in FIGS. 14A, 14B, 14C, 15A, 15B, and 15C, the storage areas (first storage area) for storing three pieces of image data constantly including still image data or representative image data can be reserved in the storage area of the buffer memory.

The remaining storage area (second storage area) stores still image data or representative image data, or a chunk depending on the type of image data specified by the bold line frame.

In this example, the image data stored in the first storage area includes three pieces of image data, but the number of pieces of image data can be appropriately set.

The configuration and the operations of a digital camera (hereinafter referred to simply as a camera) which is one of the image regeneration apparatuses for realizing the management of the buffer memory are described below.

Figure 16:
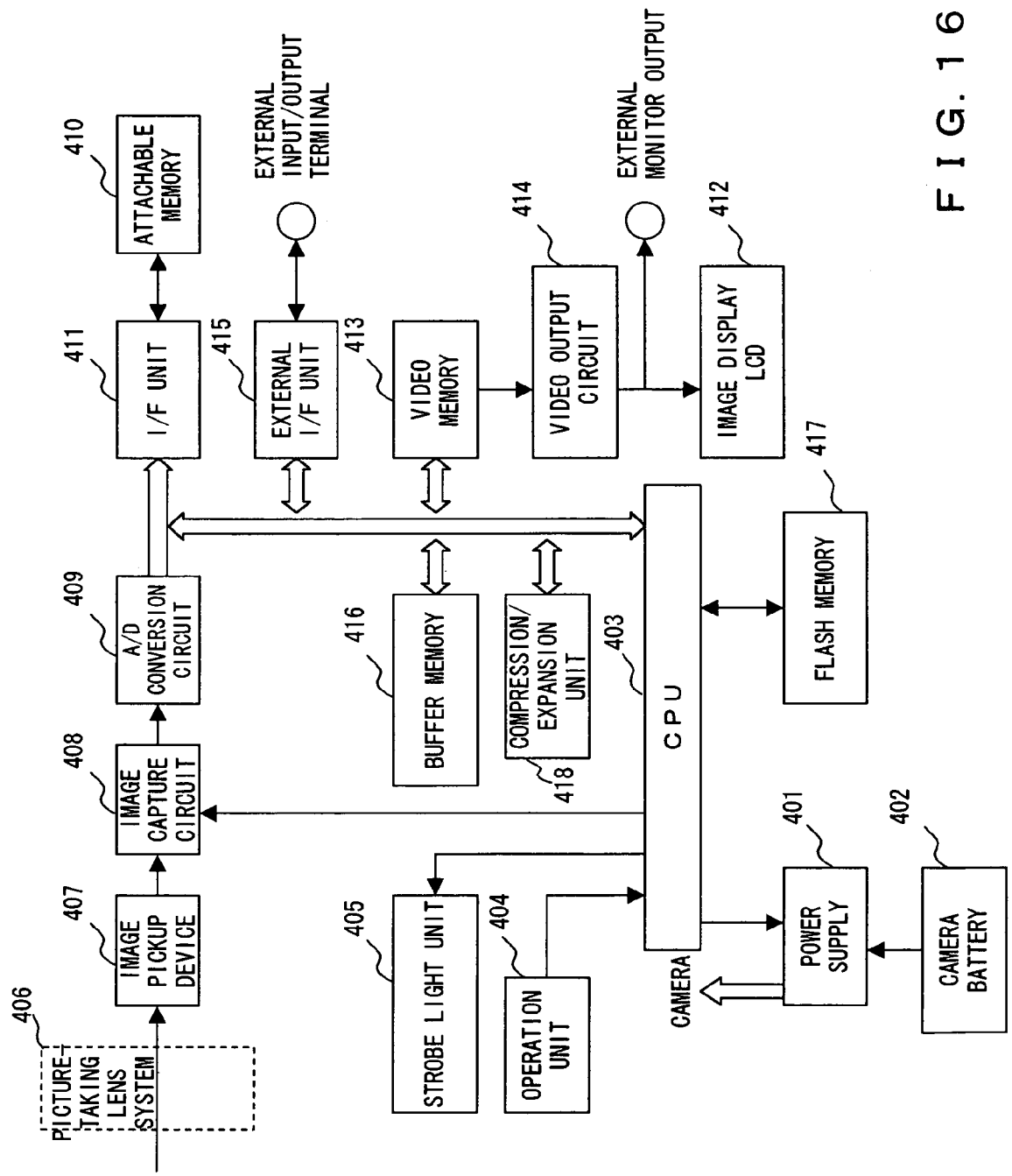
FIG. 16 is a block diagram of the digital camera according to an embodiment of the image regeneration apparatus of the present invention.

FIG. 16 is a block diagram of the camera.

In FIG. 16, a power supply 401 applies power to each unit of the camera, and the power is supplied from a camera battery, for example, a dry battery, a charged battery, etc. A CPU 403 (central processing unit, storage control unit) for controlling each unit of the camera. The CPU 403 issues an instruction to the power supply 401 to provide power for each portion of the camera, controls a target unit in response to an instruction from each operation by an operation unit 404, for example, a releasing operation by a release button not shown in the attached drawings, a mode setting operation using a mode setting switch and a menu screen, a selection switching operation of an image using a frame selection switch, a moving picture regeneration designating operation, etc., and controls the storage in the buffer memory, thereby performing a controlling process such as transferring an arithmetic result to a predetermined unit by performing an arithmetic process in response to a received instruction. A strobe light unit 405 emits a strobe light at a predetermined timing under control of the CPU 403. A picture-taking lens system 406 is a lens system for shooting a subject, and includes a zoom lens, a focus lens, etc. Through the lenses, a subject image formed on the photo-receiving surface of the picture-taking lens system 406 is converted into an electric signal by an image pickup device 407. The subject image converted into an electric signal by the image pickup device 407 is controlled by the CPU 403 in a image capture circuit 408 and handled in the AGC (auto-gain control) process, etc. An A/D conversion circuit 409 converts the subject image output by the image capture circuit 408 into a digital signal. An attachable memory 410 can be an attachable recording medium such as a memory card comprising a solid-state memory, a small hard disk device, etc. Various digital data is written to the attachable memory 410, and read to buffer memory (temporary storage unit) 416 under control of the CPU 403 through an I/F unit 411. An image display LCD 412 can be, for example, a liquid crystal display screen for displaying digital data of a subject image being shot, and read digital data such as still image data, representative image data, etc. recorded to the attachable memory 410. The digital data displayed on the image display LCD 412 is temporarily stored in video memory 413 from buffer memory 416 based on the control of the CPU 403, and displayed on the image display LCD 412 through a video output circuit 414 for output of the digital data as video data. The digital data output as video data through the video output circuit 414 can also be displayed on an external monitor other than the image display LCD 412. Communications with other external devices can be performed through an external I/F unit 415. The buffer memory 416 is random access memory configured by, for example, DRAM, etc., and, for example, temporarily stores various digital data read from the attachable memory 410. Flash memory 417 stores a control program used to direct the CPU 20 to control each unit of the digital camera and data used for various processes. A compression/expansion unit 418 performs a compression process by, for example, the JPEG (Joint Photographic Experts Group) system on the digital data read and written from the attachable memory 410 under control of the CPU 403, and performs a decompression process.

FIG. 17 is a flowchart of the storage control method for buffer memory shown in FIGS. 14A, 14B, and 14C.

The operations described below are performed by the CPU 403 shown in FIG. 16.

First, it is checked whether the image data for display in the buffer memory 416 selected based on the operation unit 404 is representative image data or still image data (S501). If the image data for display is still image data, then a storage area in the buffer memory 416 closest to the still image data in the arrangement in the frame advance order is specified in the state in which data has not been rewritten by the selection (S502). Then, it is checked (S503) whether or not the same image data for display in the frame advance order is stored in the storage area in the buffer memory 416. If the same image is stored, then control is returned to step S502, and a process is performed on the storage area in the buffer memory 416 which is the second closest in the arrangement in the frame advance order. If the check result in step S503 is not the same, the image data for display in the frame number is extracted from the attachable memory 410, and the storage area is rewritten with the image data for display (S504), control is returned to step S502, and a process is performed on the storage area in the buffer memory 416 which is the second closest in the arrangement in the frame advance order. Afterwards, the processes in steps S502 through S504 are repeatedly performed for all storage areas in the buffer memory 416, and the processes terminate when they are once performed for every storage area.

If the image data for display is representative image data in step S501, then a storage area in the buffer memory 416, which is farther from the representative image data, which is the image data for display in the frame advance order, is specified in the blank state or in the state in which data has not been rewritten by the selection (S505). Then, it is checked (S506) to which image data for display the specified storage area in the buffer memory 416 corresponds, preceding data or subsequent data in the arrangement in the frame advance order. If the storage area corresponds to none of these data, then a chunk of a higher regenerating order of moving picture data associated with the selected representative image data is extracted from the attachable memory 410, the storage area is rewritten with the chunk (S507), and control is returned to step S505. If the storage area corresponds to one of these data in step S506, the process terminates.

FIG. 18 is a flowchart of the storage control method for the buffer memory shown in FIGS. 15A, 15B, and 15C.

The processes in steps S501 through S504 shown in the flowchart are the same as the processes described above by referring to FIG. 17. Therefore, the detailed explanation is omitted here. The processes corresponding to the character R and the subsequent characters are described below. If the image data for display is representative image data in step S501, then the storage area in the buffer memory 416 storing the image data for display adjacent to the representative image data selected by the operation unit 404 in the frame advance order is specified (S601). It is checked (S602) whether or not the image data for display is stored in the specified storage area. If the image data for display is not stored, then image data for display is extracted from the attachable memory 410, and the storage area specified in step S601 is rewritten with the extracted image data for display (S603). Then, the processes corresponding to the character Q and the subsequent characters shown in FIG. 17 are performed as the processes to be performed after completing step S603 and when the image data for display is stored in the specified storage area in step S602.

The storage control method for the buffer memory shown in FIGS. 14A, 14B, 14C, 15A, 15B, and 15C can be irregularly used depending on the frame array of each type (still image data or representative image data) of image data for display. In this case, a new step of determining whether the type of image data for display selected immediately before the representative image data specified this time is still image data or representative image data is provided between step S501 and step S601 shown in FIG. 18. If it is still image data, then the processes in and after step S505 are performed. If it is representative image data, then the processes in and after step S601 are performed.

Described below is the timing at which the storage control of the buffer memory is performed.

The operations described below are performed by the CPU 403 shown in FIG. 16.

Figure 19:
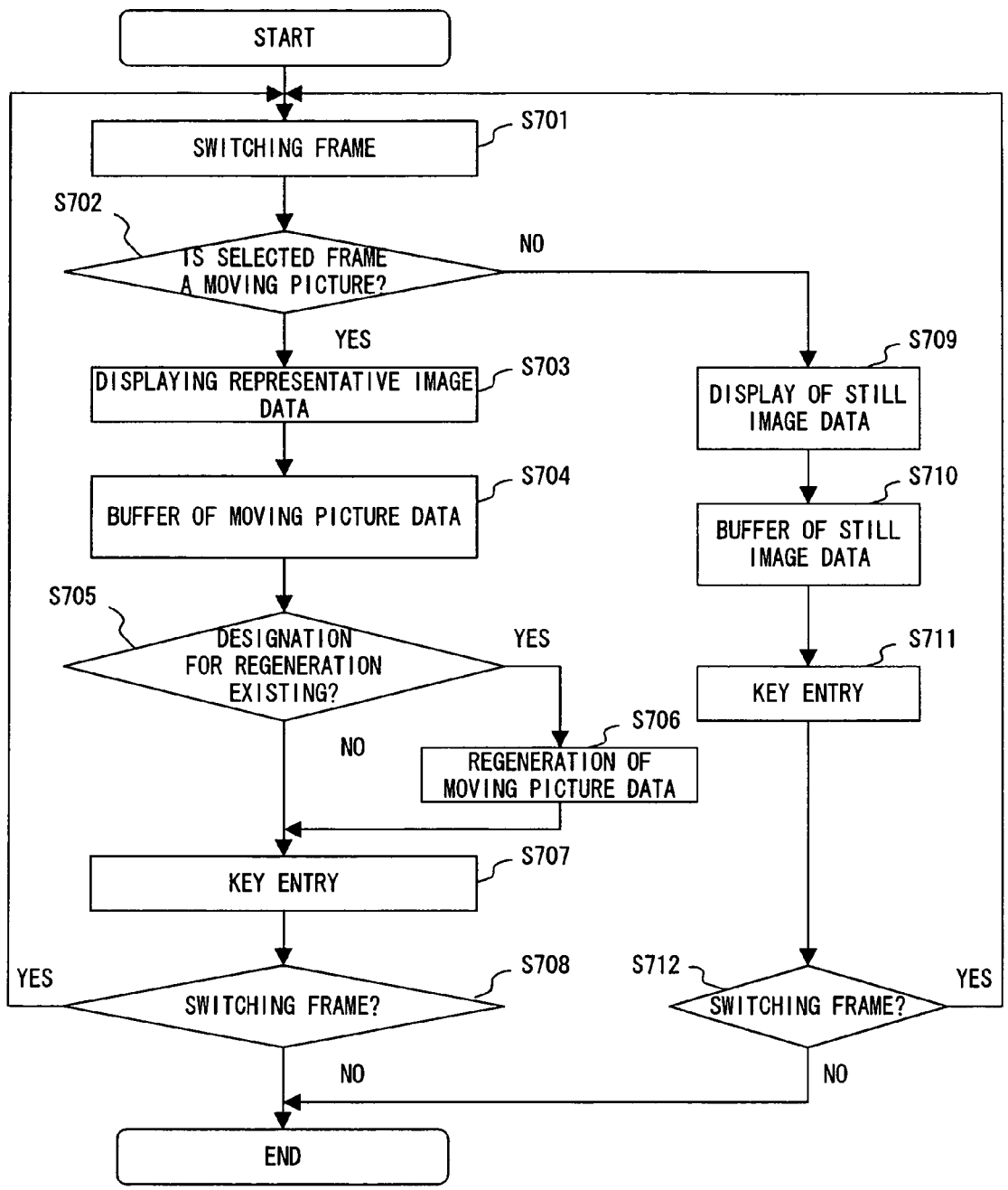
FIG. 19 shows the flow of generating image data in the digital camera shown in FIG. 16.

In FIG. 19, If a transfer of selection from the currently selected image data for display to the image data for display selected in the frame advance order is detected (S701) when various image data for display (still image data or image data for display) are read in the buffer memory 416, then the type of the detected image data for display is checked (S702). If the image data for display is representative image data, then the representative image data is displayed on the image display LCD 412 through the video memory 413 and the video output circuit 414 (S703), and each chunk of the moving picture data recorded in the attachable memory 410 is read to the buffer memory 416 by the above-mentioned buffer management method, that is, the method described by referring to FIG. 14C or 15C, (S704). Then, if the designation for regeneration for the moving picture data relating to the selected representative image data is performed, for example, a moving picture regeneration designation button (not shown in the attached drawings) of the operation unit 404 is input (S705), then the moving picture data is regenerated on the image display LCD 412 through the video memory 413 and the video output circuit 414 from the chunks read to the buffer memory 416 in order from a higher regenerating order (S706). If an input instruction, not designation for regeneration, is made (S707) and the input instruction is a selection switch of image data for display in and after step S704, then the processes from step S701 are similarly performed. If the input instruction is an instruction other than a selection switch of image data for display, then the process is terminated, and the process specified by the input instruction is performed (S708).

If the check result in step S702 is still image data, the still image data is displayed on the image display LCD 412 (S709), and the image data for display recorded in the attachable memory 410 is read to the buffer memory 416 in the above-mentioned buffer management method, that is, the method described by referring to FIG. 14B or 15B (S710). If a subsequent input instruction (S711) is a selection switch of image data for display, then the processes from step S701 are similarly performed. If the input instruction is an instruction other than the selection switch for the image data for display, then the process terminates, and the process specified by the input instruction is performed (S712).

In FIGS. 17, 18, and 19, it is assumed that various image data for display are read to the buffer memory. The read data can be set by the CPU 403 to designate the image data for display specified during initialization by selecting the image selection switch mode by the operation unit 404 and the data above and below and adjacent to the image data for display to be read from the attachable memory 410 to the buffer memory 416.

Furthermore, in the example above, the two pieces of image data for display closest to the selected image data for display are always stored in the buffer memory 416. However, the number of pieces of data is not limited to two, but any predetermined number of pieces of adjacent image data for display can be stored.

Figure 20A:
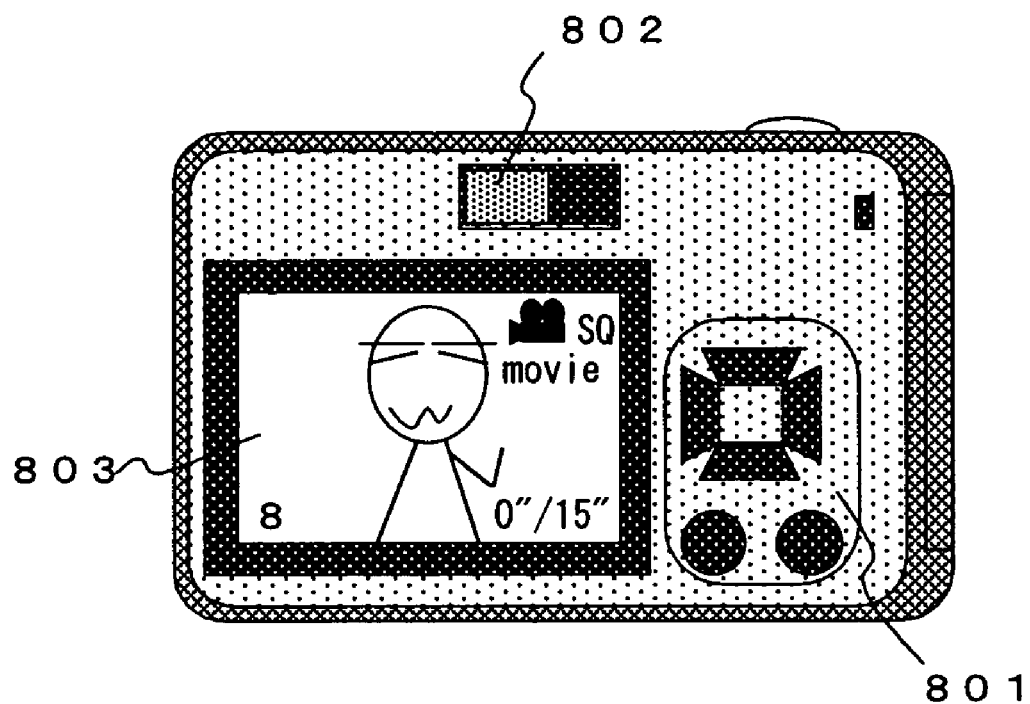
FIG. 20A shows an example of displaying moving picture data on the image display LCD of the digital camera shown in FIG. 16.
Figure 20B:
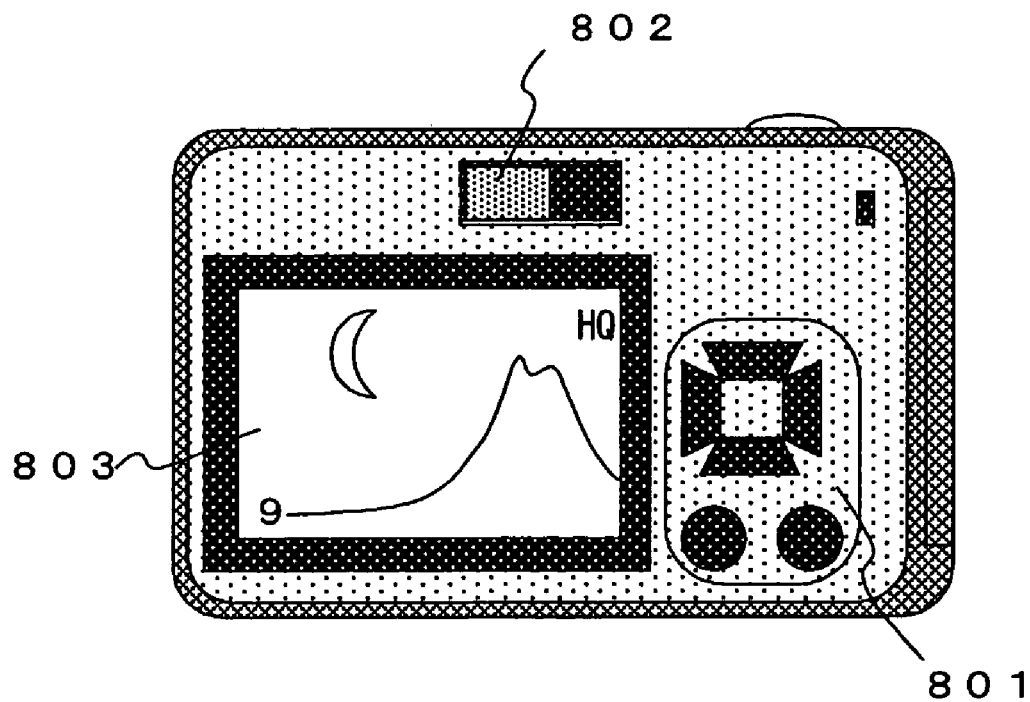
FIG. 20B shows an example of displaying still image data on the image display LCD of the digital camera shown in FIG. 16.

FIGS. 20A and 20B show examples of displaying still image data and moving picture data on the image display LCD of a digital camera. In the figures, 801 denotes the operation unit 404, 802 denotes a finder, and 803 denotes the image display LCD 412.

FIG. 20A shows an example of displaying moving picture data. As displayed on the image display LCD 412, an icon indicating moving picture data and a shooting mode are displayed at the upper right portion, a regeneration time and a frame number are displayed at the lower right portion, and the number n of moving picture data can be superimposed on the regenerated image of the moving picture data at the lower left portion.

FIG. 20B shows an example of displaying still image data. As displayed on the image display LCD 412, the shooting mode can be shown at the upper right portion, and the frame number n of still image data can be superimposed on the regenerated image of the still image data at the lower left portion.

Thus, in the above-mentioned digital camera, the regeneration start waiting time after the designation for regeneration can be remarkably shortened because all or a part of moving picture data is read to the buffer memory before the designation for regeneration of moving picture data.

Furthermore, since the image data for display adjacent to the selected still image data in the frame advance order is read to the buffer memory, the image data for display can be smoothly selected in the frame advance order.

Additionally, since the image data for display closer in the frame advance order to the selected image data for display is read to the buffer memory constantly by a predetermined amount, the adjacent image data for display can be smoothly selected for transfer.

Although the buffer memory is rewritten with a chunk of moving picture data when representative image data is selected with image data for display read to the entire buffer memory, it is rewritten from the farthest data from the selected representative image data in the frame advance order. Therefore, if the selection is switched before the rewriting process is completed using a chunk, a large amount of image data for display adjacent to the selected representative image data in the frame advance order are kept as not rewritten, and the image data for display can be smoothly selected in a wide range in the frame advance order.

As described above, the image processing device according to the third aspect of the present invention can read in advance an image data group of selected representative image data to the buffer memory, thereby remarkably shortening the regeneration start waiting time for the image data group.

Since a read of an image data group to the buffer memory has been selected, the regeneration start waiting time can be shortened even though there is a large amount of image data groups.

Furthermore, since image data groups such as a single piece of image data, moving pictures, etc. can be managed in the same buffer memory, and the storage area of image data to be selected by the image selection unit can be constantly reserved in a predetermined area, the image data can be quickly selected and regenerated by a less expensive device.

The above-mentioned processes according to the first through third aspects of the present invention can be realized by the CPU reading the control program about the contents of the above-mentioned operations from the memory. Therefore, the control program, the storage medium storing the control program, and a program product are included in the present invention.

Figure 21:
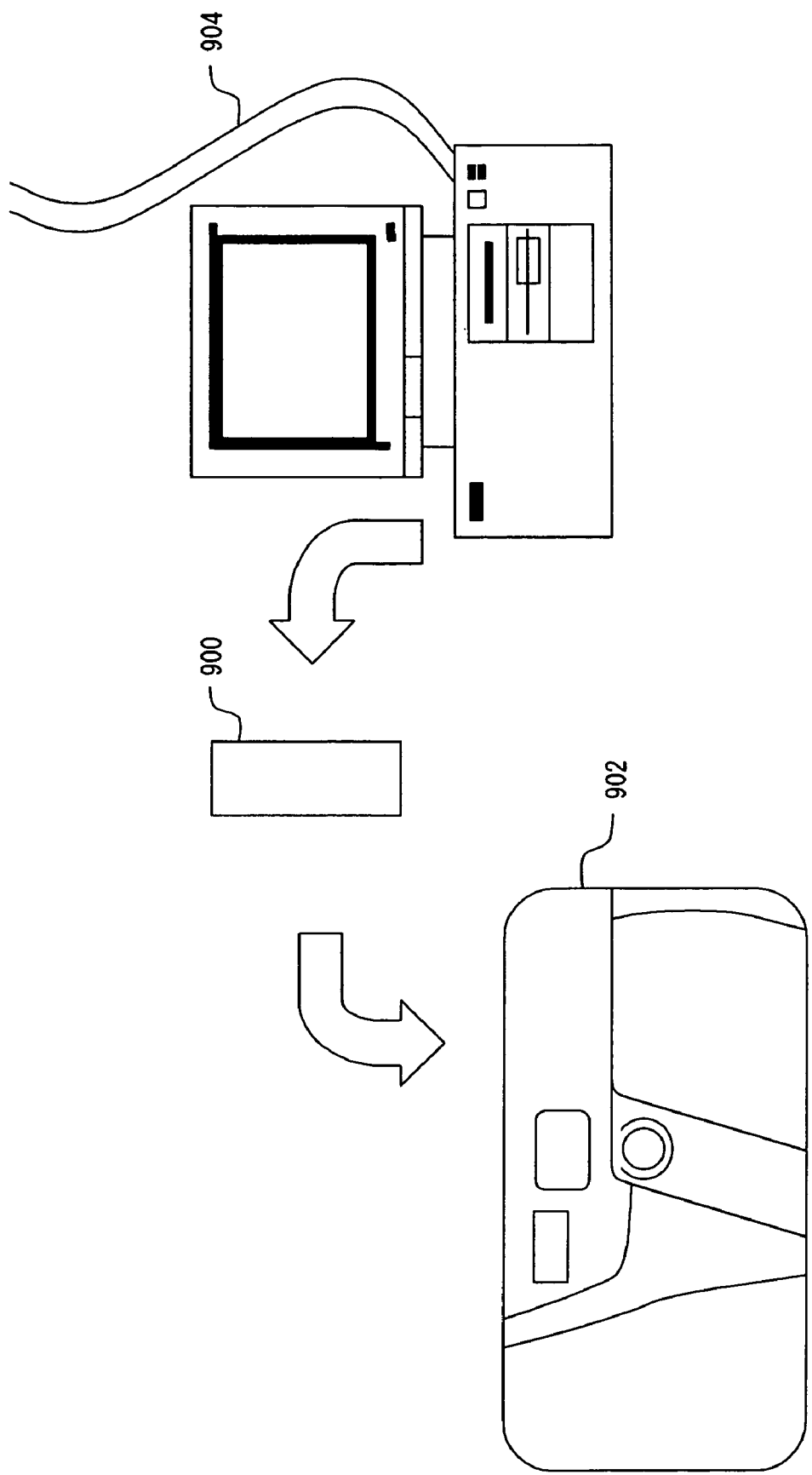
FIG. 21 shows the style of providing a program to be embedded in the camera shown in FIG. 2, 8, or 16.

Therefore, the control program can be recorded in advance to the built-in memory of a digital camera, can be stored in non-volatile built-in memory of a digital camera 902 from a handy memory card 900 such as CompactFlash®, SmartMedia®, etc. as shown in FIG. 21, or can be stored in a non-volatile built-in memory of the digital camera 902 after being downloaded to the digital camera 902 through a network 904, thereby configuring a digital camera according to the present invention.

Variations of the present invention can be embodied without departing from the true spirit and scope of the invention. Therefore, the above-mentioned embodiments are only examples, and the present invention is not limited thereto. The scope of the present invention is defined by the scope of the claims for the patent, and not limited to the text of the specifications. Furthermore, any variations and amendments to the scope equivalent to the scope of the claims for the patent are included in the present invention.

What is claimed is:

1. An image compression apparatus which sequentially compresses continuously input images according to a quantization parameter, comprising:
    a processing unit compressing an input image according to a quantization parameter;
    a computation unit computing the quantization parameter by performing trial compression on an input image; and
    a control unit enabling the computation unit to compute a new quantization parameter on an image input at an interval measured in units of a predetermined number of images and enabling the processing unit to compress the image input at the interval according to the new quantization parameter, and enabling the processing unit to compress input images other than the image input at the interval according to a latest quantization parameter used immediately before computation of a new quantization parameter.

2. The image compression apparatus according to claim 1, characterized in that
    the image compression apparatus is incorporated into a digital camera.

3. The image compression apparatus according to claim 1, characterized in that
    the continuously input images are obtained by shooting moving pictures.

4. The image compression apparatus according to claim 3, characterized in that
    the image compression apparatus is incorporated into a digital camera.

5. The image compression apparatus according to claim 1, characterized in that
    the continuously input images are obtained by continuously shooting images.

6. The image compression apparatus according to claim 5, characterized in that
    the image compression apparatus is incorporated into a digital camera.

7. An image compressing method for sequentially compressing continuously input images according to a quantization parameter, comprising the steps of:
    computing a new quantization parameter by performing trial compression on an image input at an interval measured in units of a predetermined number of images, thereby performing a compression process for the image input at the interval according to the computed quantization parameter; and
    compressing input images other than the image input at the interval according to a latest quantization parameter used immediately before computation of the new quantization parameter.

8. A computer-readable storage medium storing a program used to direct a computer to perform the procedures of:

computing a quantization parameter by performing trial compression on an image input at an interval measured in units of a predetermined number of images, and performing a compression process for the image input at the interval according to the computed quantization parameter; and performing a compression process for input images other than the image input at the interval according to a latest quantization parameter used immediately before computation of a new quantization parameter.

* * * * *